United States Patent
Phillips

(10) Patent No.: US 10,824,761 B2
(45) Date of Patent: Nov. 3, 2020

(54) DIGITAL PATTERN PROGNOSTICS

(71) Applicant: General Electric Company, Schenectady, NY (US)

(72) Inventor: Richard Alan Phillips, San Ramon, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/613,301

(22) Filed: Jun. 5, 2017

(65) Prior Publication Data

US 2017/0357828 A1    Dec. 14, 2017

(30) Foreign Application Priority Data

Jun. 10, 2016  (EP) .................................... 16173941

(51) Int. Cl.
*G06F 21/64* (2013.01)
*G06F 16/00* (2019.01)
(Continued)

(52) U.S. Cl.
CPC .............. *G06F 21/64* (2013.01); *G06F 16/00* (2019.01); *G06F 40/40* (2020.01);
(Continued)

(58) Field of Classification Search
CPC .......... G06F 21/64; G06F 16/00; G06F 17/28; G06K 9/00496; G06Q 10/06; G06N 20/00; G06N 3/02; G06N 7/005
See application file for complete search history.

(56) References Cited

U.S. PATENT DOCUMENTS 7,493,388 B2 *   2/2009   Wen .......................... G06F 9/50
                                                         705/28
7,606,741 B2 *  10/2009   King .................. H04N 1/00244
                                                        705/27.2
(Continued)

FOREIGN PATENT DOCUMENTS

EP          2801937 A1      11/2014
EP          3255581 A1      12/2017

OTHER PUBLICATIONS

Ashwin Siripurapu, "Convolutional Networks for Stock Trading", URL: http://cs231n.stanford.edu/reports/ashwin_final_paper.pdf, Mar. 25, 2015.

(Continued)

*Primary Examiner* — Joseph P Hirl
*Assistant Examiner* — Stephen T Gundry
(74) *Attorney, Agent, or Firm* — Dority & Manning, P.A.

(57) ABSTRACT

Systems and techniques for facilitating digital data prognostics are presented. A system can processes a corpus of stored data, generate respective digital signatures representing respective subsets of the corpus of the stored data, and tag the respective digital signatures with tags corresponding to extrinsic events. The digital signatures can be stored and indexed in a digital signature library. The system can also compare a new digital signature to learned digital signatures in order to identify one or more matches, and prognose an upcoming event associated with the new digital signature based on the matches and generated inferences for the learned digital signatures.

20 Claims, 13 Drawing Sheets

(51) Int. Cl.
  *G06K 9/00*  (2006.01)
  *G06F 40/40*  (2020.01)
  *G06N 20/00*  (2019.01)
  *G06N 3/02*  (2006.01)
  *G06N 7/00*  (2006.01)
(52) U.S. Cl.
  CPC .......... *G06K 9/00496* (2013.01); *G06N 3/02* (2013.01); *G06N 7/005* (2013.01); *G06N 20/00* (2019.01)

(56) References Cited

U.S. PATENT DOCUMENTS

| | | | | |
|---|---|---|---|---|
| 7,899,777 | B2* | 3/2011 | Baier | G06Q 10/06 706/60 |
| 7,930,546 | B2* | 4/2011 | Rhoads | G10L 25/48 358/3.28 |
| 8,026,933 | B2* | 9/2011 | Baier | G06Q 10/06 345/660 |
| 8,027,518 | B2* | 9/2011 | Baker | G06K 9/00885 340/5.52 |
| 8,677,262 | B2* | 3/2014 | Baier | G05B 19/0426 715/772 |
| 8,817,984 | B2* | 8/2014 | Miller | H04L 63/0861 380/255 |
| 9,292,793 | B1* | 3/2016 | Lin | G06N 5/04 |
| 9,322,974 | B1* | 4/2016 | Giobbi | H04L 63/0853 |
| 9,516,053 | B1* | 12/2016 | Muddu | G06F 16/254 |
| 9,589,074 | B2* | 3/2017 | Bhattacharjee | G06F 16/9038 |
| 9,842,302 | B2* | 12/2017 | Bates | G05B 23/024 |
| 9,843,877 | B2* | 12/2017 | Gonzales, Jr. | G10L 25/18 |
| 10,193,901 | B2* | 1/2019 | Muddu | G06F 16/254 |
| 2009/0085934 | A1* | 4/2009 | Baier | G06Q 10/06 345/660 |
| 2009/0089225 | A1* | 4/2009 | Baier | G06Q 10/06 706/12 |
| 2009/0089701 | A1* | 4/2009 | Baier | G05B 19/0426 715/772 |
| 2011/0276157 | A1* | 11/2011 | Wang | H04N 21/8549 700/94 |
| 2012/0201381 | A1* | 8/2012 | Miller | H04L 9/16 380/255 |
| 2014/0279762 | A1* | 9/2014 | Xaypanya | G06N 3/08 706/12 |
| 2014/0337277 | A1* | 11/2014 | Asenjo | G06Q 10/06 707/603 |
| 2014/0351765 | A1* | 11/2014 | Rodriguez | G06T 19/006 715/847 |
| 2014/0357312 | A1* | 12/2014 | Davis | H04W 4/50 455/550.1 |
| 2015/0286873 | A1* | 10/2015 | Davis | G06F 1/1694 382/103 |
| 2016/0055262 | A1* | 2/2016 | Bhattacharjee | G06F 16/90344 707/722 |
| 2016/0116378 | A1* | 4/2016 | Bates | G05B 23/024 702/182 |
| 2016/0119672 | A1* | 4/2016 | Alonso | H04N 21/44008 725/19 |
| 2016/0191957 | A1* | 6/2016 | Teixeira | H04N 21/4622 725/32 |
| 2016/0364279 | A1* | 12/2016 | Brew | G06F 11/3447 |
| 2017/0063886 | A1* | 3/2017 | Muddu | G06F 16/254 |
| 2017/0063887 | A1* | 3/2017 | Muddu | G06F 16/254 |
| 2017/0063888 | A1* | 3/2017 | Muddu | G06N 5/022 |
| 2017/0140141 | A1* | 5/2017 | Yan | G06F 21/32 |
| 2017/0195810 | A1* | 7/2017 | Gonzales, Jr. | G07C 5/0816 |
| 2017/0213130 | A1* | 7/2017 | Khatri | G06N 3/0445 |
| 2017/0262758 | A1* | 9/2017 | Boyapalle | G06F 21/00 |
| 2017/0339178 | A1* | 11/2017 | Mahaffey | H04L 41/142 |
| 2017/0357828 | A1 | 12/2017 | Phillips | |
| 2017/0358283 | A1* | 12/2017 | Neuhauser | G10L 25/84 |
| 2018/0069763 | A1* | 3/2018 | Tee | H04L 12/4625 |
| 2018/0082217 | A1* | 3/2018 | Bates | G05B 23/024 |
| 2018/0091378 | A1* | 3/2018 | Tee | H04L 41/046 |
| 2018/0367560 | A1* | 12/2018 | Mahaffey | H04W 12/1208 |

OTHER PUBLICATIONS

Weiqiang Lin, et al., "An Overview of Temporal Data Mining", URL: http://togaware.com/papers/adm02.pdf, Jan. 1, 2002, Sydney, AU.
First Canadian Office Action Corresponding to Application No. 2969957 dated Mar. 19, 2018.
Second Canadian Office Action Corresponding to Application No. 2969957 dated Feb. 18, 2019.
European Search Report Corresponding to Application No. 161739412 dated Dec. 9, 2016.
European Office Action Corresponding to Application No. 161739412 dated Jul. 15, 2019.

* cited by examiner

DIGITAL PATTERN PROGNOSTICS

TECHNICAL FIELD

This disclosure relates generally to digital data processing prognostics (e.g., via employment of artificial intelligence).

BACKGROUND

A vast amount of data (e.g., trillions of bytes) is generated daily by various network-connected devices and/or network-connected systems (e.g., sensors, mobile devices, device logs, controllers, etc.) throughout the world. Such data is often saved on cloud-based data infrastructure(s), and typically stored as unstructured data. Consequently, processing, searching and/or analyzing the voluminous amounts of unstructured data is computationally expensive, let alone difficult. Furthermore, gleaning insights from data stored on a cloud-based data infrastructure is generally time consuming and/or not easy to achieve.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an example implementation, a system includes a data signature generation component, a tagging component, an artificial intelligence component, a search component, a prognostics component and a display component. The data signature generation component processes a corpus or set of stored data and generates respective digital signatures representing respective subsets of the corpus of the stored data. The digital signatures are stored and indexed in a digital signature library. The tagging component tags the respective digital signatures with tags corresponding to extrinsic events. The artificial intelligence component learns the respective digital signatures and associated tags, and generates inferences regarding the respective digital signatures. The search component searches and compares a new digital signature to the learned digital signatures in order to identify one or more matches. The prognostics component prognoses an upcoming event associated with the new digital signature based at least in part on the generated inferences and the matches. The display component generates a user interface, for display, that outputs the prognoses in a human interpretable format.

Additionally, a non-limiting implementation provides for generating a first digital signature based on a portion of stored data, tagging the first digital signature with a tag corresponding to an event extrinsic to the system, storing the first digital signature in a digital signature library, generating inferences regarding the first digital signature, comparing a second digital signature to the first digital signature in order to identify a match, identifying an upcoming event associated with the second digital signature based at least in part on the inferences and the match, and generating a user interface that outputs information associated with the upcoming event in a human interpretable format via a display.

In accordance with another example implementation, a computer readable storage device comprising instructions that, in response to execution, cause a system comprising a processor to perform operations, comprising: generating a first digital fingerprint based on a portion of data stored in a first data store, generating a tag for the first digital fingerprint to associate the first digital fingerprint with an extrinsic event, storing the first digital fingerprint in a second data store, determining inferences associated with the first digital fingerprint, identifying a match between a second digital fingerprint and the first digital fingerprint, identifying an upcoming event associated with the second digital fingerprint based at least in part on the inferences and the match, and presenting information associated with the upcoming event in a human interpretable format via a user interface associated with a display.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
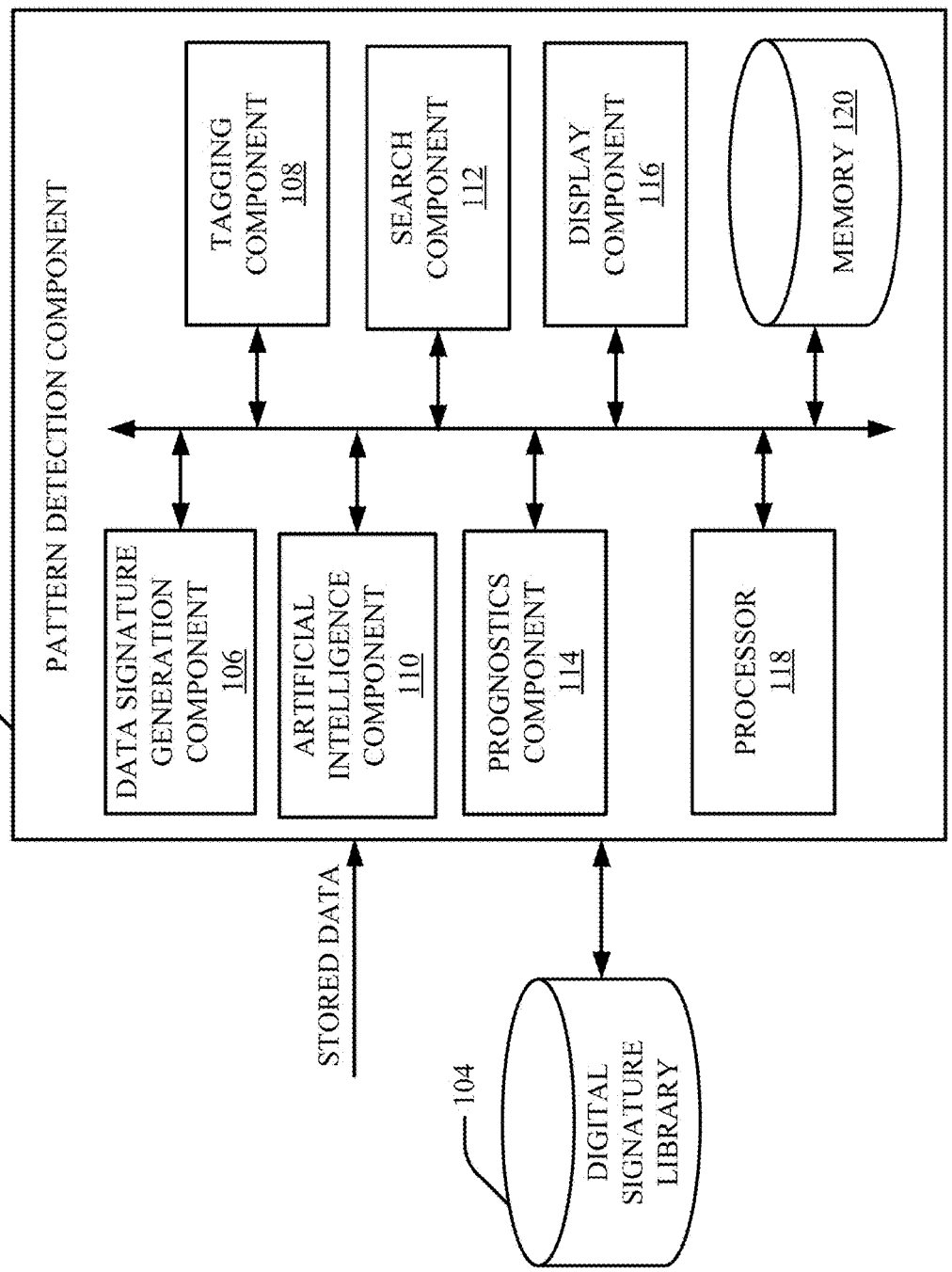
FIG. 1 illustrates a high-level block diagram of an example pattern detection component, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Systems and techniques for employing a digital pattern to facilitate digital data prognostics are presented. For example, a digital library of digital fingerprints (e.g., digital signatures, digital patterns) can be created. A digital fingerprint stored in the digital library can include one or more parameters and corresponding values over a certain period of time. For example, a digital fingerprint can be a subset of parametric time-series data derived from a stream of parametric time-series data and/or a set of parametric time-series data. Artificial intelligence can also be employed to perform learning with respect to the digital fingerprints in the digital library and/or to identify correlations between the digital fingerprints and anomalies (e.g., unique behavior) associated with time-series data. Anomalies associated with time-series data can be related to particular graphical characteristics associated with the time-series data. For example, anomalies can be identified from time-series data based on peaks in the time-series data, troughs in the time-series data, a rate of change associated with the time-series data, etc. These anomalies can also predict and/or be associated with an event (e.g., an extrinsic event). For example, an event (e.g., an extrinsic event) can be associated with an asset and/or an external system that provides and/or generates time-series data for the digital fingerprints. Tags can also be generated for the digital fingerprints stored in the digital library to facilitate identification of similar anomalies and/or similar events in other portions of the time-series data. In response to learning and/or determined correlations for the digital fingerprints via one or more artificial intelligence techniques, the tags can also be updated.

Rather than a conventional system that searches unstructured datasets of time-series data, the digital library of digital fingerprints and/or the tags can be employed to search other portions of the time-series data (e.g., other portions of the time-series data stored in one or more databases and/or included in a stream of time-series data) for similar anomalies and/or similar events. The digital library of digital fingerprints and/or the tags can be additionally or alternatively employed for use in analytics as conditional statements to trigger execution of one or more actions. Furthermore, the digital library of digital fingerprints can be repeatedly updated and/or refined over time to facilitate identification of similar anomalies and/or similar events in other portions of time-series data. By employing the digital library of digital fingerprints and/or the tags, particular trends and/or behaviors in time-series data can be detected that a conventional data training algorithm would generally not be able to detect. For example, the digital library of digital fingerprints can facilitate detection of anomalies in data associated with an asset system without knowledge of past anomalies associated with the asset system. Compared to a conventional system, the digital library of digital fingerprints and/or the tags can also provide improved accuracy, reduced time and/or greater adaptability for predicting anomalies and/or behavior associated with time-series data. The digital library of digital fingerprints and/or the tags can also be employed to analyze a system associated with time-series data and/or to perform a utility-based analysis of a system associated with time-series data. As such, management of time-series data and/or systems associated with time-series data can be improved. Moreover, performance of systems that generate and/or provide time-series data can be improved and/or costs associated with the systems can be reduced.

Referring initially to FIG. 1, there is illustrated an example system 100 that identifies, generates and/or manages a digital pattern to facilitate digital data prognostics, according to an aspect of the subject disclosure. The system 100 can be implemented on or in connection with a network of servers associated with an enterprise application (e.g., an enterprise network of connected machines). The system 100 can be employed by various systems, such as, but not limited to industrial systems, aviation systems, manufacturing systems, factory systems, energy management systems, power grid systems, water supply systems, transportation systems, healthcare systems, refinery systems, media systems, research systems, financial systems, data-driven prognostics systems, machine learning systems, neural network systems, network systems, computer network systems, communication systems, router systems, server systems, high availability server systems (e.g., Telecom server systems), Web server systems, file server systems, data server systems, disk array systems, powered insertion board systems, cloud-based systems, and the like. In one example, the system 100 can be associated with a Platform-as-a-Service (PaaS) and/or an asset performance management system. In another example, the system 100 can be a digital prognostics system. Moreover, the system 100 and/or the components of the system 100 can be employed to use hardware and/or software to solve problems that are highly technical in nature (e.g., related to machine learning, related to digital data processing prognostics, related to digital data analytics, etc.), that are not abstract and that cannot be performed as a set of mental acts by a human.

The system 100 can include a pattern detection component 102. The pattern detection component 102 can be communicatively coupled to a digital signature library 104. In FIG. 1, the pattern detection component 102 includes a data signature generation component 106, a tagging component 108, an artificial intelligence component 110, a search component 112, a prognostics component 114 and a display component 116. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the pattern recognition component 102) can include memory 120 for storing computer executable components and instructions.

The system 100 (e.g., the pattern recognition component 102) can further include a processor 118 to facilitate operation of the instructions (e.g., computer executable components and instructions) by the system 100 (e.g., the pattern recognition component 102).

The pattern recognition component 102 (e.g., the data signature generation component 106) can receive stored data (e.g., STORED DATA shown in FIG. 1). The stored data can be received from one or more databases (e.g., a network of databases). For example, the stored data can be associated with data stored on a network of servers. The stored data can also be a corpus of stored data generated by and/or associated with a plurality of data sources. For example, the stored data can be generated by and/or associated with various assets, various types of devices, various types of machines and/or various types of equipment. Furthermore, the plurality of data sources can be located at a plurality of locations (e.g., a plurality of geographic locations). Aspects of the plurality of data sources can also be dynamic. For example, a data source associated with the stored data can be a moveable asset or a moveable machine (e.g., a location of the data source can vary, etc.).

The stored data can also be, for example, a parametric data set that includes one or more parameters and corresponding data values. The stored data can include various data, such as but not limited to, sensor data, process data (e.g., process log data), operational data, monitoring data, maintenance data, parameter data, measurement data, performance data, audio data, image data, video data, industrial data, machine data, asset data, equipment data, device data, meter data, real-time data, historical data and/or other data. For example, the stored data can be associated with an audio system, a vibration detection system, a temperature detection system, an image system, a video capturing system, a pressure detection system, a flow rate detection system, electrical current sensors, voltage detectors, a heat loading system and/or another system associated with time-series data. The stored data can also be encoded data, processed data and/or raw data. In a non-limiting example, the stored data can be associated with data gathered from multiple assets for an airline company (e.g., multiple aircrafts, multiple airline flights, etc.) and/or multiple enterprise systems associated with multiple airline companies. However, it is to be appreciated that the stored data can be associated with different systems such as, but not limited to industrial systems, aviation systems, manufacturing systems, factory systems, energy management systems, power grid systems, water supply systems, transportation systems, healthcare systems, refinery systems, media systems, financial systems, research systems, PaaS systems, asset performance management systems, other enterprise systems, etc.

The data signature generation component 106 can process the stored data, and can also generate digital signature(s) for the stored data. For example, the data signature generation component 106 can generate respective digital signatures representing respective subsets of the corpus of stored data. A digital signature can be associated with digital fingerprint data that represents a digital pattern. For example, a digital signature can be a digital fingerprint that comprises digital fingerprint data (e.g., a string of bits) associated with a portion of the stored data. A digital signature can also include a set of data values for one or more parameters over a defined period of time. As such, a set of data values for one or more parameters over a defined period of time can represent a digital fingerprint for an event. In certain implementations, a digital signature can comprise a sequence of sub-fingerprints. Furthermore, a digital signature can uniquely identify and/or convey a portion of the stored data. For example, a digital signature can be a data element that encodes a portion of the stored data. A digital signature can also be associated with a timestamp and/or a period of time. Moreover, a digital signature can represent a digital pattern for a portion of the stored data. For instance, a digital signature can be generated based on physical characteristics of the stored data such as peaks in the stored data, troughs in the stored data, speed of change associated with the stored data, a length of time between a first peak in the stored data and a second peak in the stored data and/or other graphical characteristics of the stored data. As such, a digital signature can convey trends (e.g., graphical trends) and/or predict anomalies in the stored data. Furthermore, the data signature generation component 106 can generate a digital signature without prior knowledge of anomalies associated with the stored data. For example, the data signature generation component 106 can generate a digital signature in real-time based on extrinsic evidence related to environmental conditions, ambient evidence and/or other conditions related to an asset system associated with the stored data.

The data signature generation component 106 can employ one or more digital fingerprinting techniques (e.g., one or more digital fingerprint algorithms) to map the stored data into the digital signatures for the stored data. For example, the data signature generation component 106 can employ a hash technique to generate the digital signatures for the stored data. In another example, the data signature generation component 106 can employ a locality sensitive hashing technique to generate the digital signatures for the stored data. In yet example, the data signature generation component 106 can employ a random hashing technique to generate the digital signatures for the stored data. In an implementation, a digital signature can comprise min-hash values associated with a portion of the stored data. For example, a digital signature can comprise a vector of min-hash values associated with a portion of the stored data. In another example, a digital signature can comprise a band of min-hash values associated with a portion of the stored data. In yet another example, a digital signature can comprise a locality-sensitive hashing band of min-hash values associated with a portion of the stored data. The digital signatures for the stored data can also be associated with a set of min-hash signatures, a set of weighted min-hash signatures and/or a set of min-wise independent permutation for the stored data. However, it is to be appreciated that other types of digital fingerprinting techniques and/or hashing techniques can be employed to generate the digital signatures for the stored data.

A digital signature generated by the data signature generation component 106 can be associated with an event (e.g., an extrinsic event). An event (e.g., an extrinsic event) can be an event related to a system associated with the stored data and/or the plurality of data sources (e.g., the plurality of data sources that generate by and/or are associated with the stored data). An event (e.g., an extrinsic event) can additionally or alternatively be a process related to a system associated with the stored data and/or the plurality of data sources (e.g., the plurality of data sources that generate by and/or are associated with the stored data). For example, an event (e.g., an extrinsic event) can be associated with extrinsic evidence for a system associated with the stored data and/or the plurality of data sources. In a non-limiting example, an event (e.g., an extrinsic event) can be a condition in a factory or a condition for a machine in a factory. In another non-limiting example, an event (e.g., an extrinsic event) can be a condition for a device associated with a controller. In yet another non-limiting example, an event (e.g., an extrinsic event) can be a condition related to an asset associated with the stored data. The event (e.g., the extrinsic event) can also be associated with timestamp information, location information and/or device information. A digital signature generated by the data signature generation component 106 can include a sequence of values for one or more parameters during an interval of time prior to an event. Additionally, in certain implementations, a digital signature generated by the data signature generation component 106 can include another sequence of values for the one or more parameters during another interval of time after the event. In an aspect, the data signature generation component 106 can generate a digital signature in response to an event (e.g., an extrinsic event). For example, the data signature generation component 106 can identify an event associated with the stored data and/or a certain time value for the event. Alternatively, the data signature generation component 106 can receive an indication of an event associated with the stored data and/or a certain time value for the event. For example, the data signature generation component 106 can generate a data signature in response feedback data (e.g., input data) that identifies an event at a certain time. The identification of the event at the certain time can be determined, for example, by a user that interacts with a user interface on a display.

The tagging component 108 can tag the respective digital signatures with tags corresponding to events (e.g., extrinsic events). For example, the tagging component 108 can associate the respective digital signatures with respective identifiers associated with respective events (e.g., respective extrinsic events). As such, a tagged digital signature can also be associated with an event. A set of data values for one or more parameters over a defined period of time for an event can represent a digital fingerprint. The tagging component 108 can store one or more tags for each digital signature stored in the digital signature library 104. A tag can be data (e.g., metadata) assigned to a digital signature that identifies an event and/or other information associated with a digital signature. Information associated with a tag can include, for example, text, comments, a description, a timestamp, images, etc.

A digital signature that is tagged by the tagging component 108 can be stored in the digital signature library 104. For example, the digital signature library 104 can include a set of tagged digital signatures. Alternatively, the digital signature library 104 can store the digital signatures without tags. By storing a set of tagged digital signatures and/or a set of digital signatures, the digital signature library 104 can be employed as a library of digital patterns and/or a library of grouped parameters. The digital signature library 104 can be a data store (e.g., a database) that stores digital signatures generated by the data signature generation component 106 and/or tagged by the tagging component 108. In an implementation, the digital signature library 104 can be separate from the pattern detection component 102. In another implementation, the pattern detection component 102 can include the digital signature library 104.

The set of tagged digital signatures that are stored in the digital signature library 104 can be employed to detect future events associated with events represented by the set of tagged digital signatures. To facilitate detection of the future events, the artificial intelligence component 110 can learn the respective digital signatures and associated tags. The artificial intelligence component 110 can also generate inferences regarding the respective digital signatures. The artificial intelligence component 110 can employ principles of artificial intelligence to facilitate learning and/or generating inferences for the respective digital signatures and/or associated tags. The artificial intelligence component 110 can perform learning explicitly or implicitly. The learning and/or generated inferences by the artificial intelligence component 110 can facilitate identification and/or classification of different patterns associated with the stored data.

The artificial intelligence component 110 can also employ an automatic classification system and/or an automatic classification process to facilitate learning and/or generating inferences for the respective digital signatures and/or associated tags. For example, the artificial intelligence component 110 can employ a probabilistic and/or statistical-based analysis (e.g., factoring into the analysis utilities and costs) to learn and/or generate inferences for the respective digital signatures and/or associated tags. The artificial intelligence component 110 can employ, for example, a support vector machine (SVM) classifier to learn and/or generate inferences for the respective digital signatures and/or associated tags. Additionally or alternatively, the artificial intelligence component 110 can employ other classification techniques associated with Bayesian networks, decision trees and/or probabilistic classification models. Classifiers employed by the artificial intelligence component 110 can be explicitly trained (e.g., via a generic training data) as well as implicitly trained (e.g., via observing user behavior, receiving extrinsic information). For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence (class). The artificial intelligence component 110 can also employ, in certain implementations, historical data in addition to the stored data to facilitate learning and/or generating inferences for the respective digital signatures and/or associated tags.

In an aspect, the artificial intelligence component 110 can include an inference component that can further enhance automated aspects of the artificial intelligence component 110 utilizing in part inference based schemes to facilitate learning and/or generating inferences for the respective digital signatures and/or associated tags. The artificial intelligence component 110 can employ any suitable machine-learning based techniques, statistical-based techniques and/or probabilistic-based techniques. For example, the artificial intelligence component 110 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc.

In another aspect, the artificial intelligence component 110 can perform a set of machine learning computations associated with the stored data. For example, the artificial intelligence component 110 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations. Learned digital signatures associated with the artificial intelligence component 110 can be stored, for example, in the digital signature library 104. Digital signatures and/or tags stored in the digital signature library 104 can also be repeatedly updated by the data signature generation component 106 and/or the tagging component 108 in response to new stored data received by the pattern detection component 102 and/or learning and inferences associated with the artificial intelligence component 110. As such, the digital signature library 104 can be repeatedly built and/or refined during an interval of time.

The search component 112 can search and/or compare a new digital signature to the learned digital signatures in order to identify one or more matches. For example, after a new digital signature is generated by the data signature generation component 106 using the techniques disclosed herein, the search component 112 can compare the new digital signature to the learned digital signatures. The data signature generation component 106 can generate the new digital signature in response to receiving a portion of the stored data associated with the new digital signature. The new digital signature can be associated with a portion of the stored data that is different than other portions of the stored data associated with the learned digital signatures. A match between a new digital signature to the learned digital signatures can indicate a matched event. The search component 112 can determine whether the new digital signature is similar to one or more of the learned digital signatures. For example, the search component 112 can compute similarity between the new digital signature and the learned digital signatures. A new digital signature can be determined to match a learned digital signature if a pattern of the new digital signature matches the learned digital signature. A match between a new digital signature and a learned digital signature can be, for example, approximately an exact match. Alternatively, a match between a new digital signature and a learned digital signature can be, for example, a fuzzy match. The search component 112 can compute similarity based on learning and/or inferences determined by the artificial intelligence component 110. Additionally, the search component 112 can compute similarity based on one or more pattern recognition techniques and/or one or more statistical techniques.

The search component 112 can compute similarity, in one example, based on hashing scheme values (e.g., min-hash data values) of the new digital signature and corresponding hashing scheme values (e.g., corresponding min-hash data values) of a learned digital signature. Additionally or alternatively, the search component 112 can compute similarity between the new digital signature and the learned digital signatures based on a distance metric. For example, the search component 112 can compute similarity between the new digital signature and the learned digital signatures based on a Hamming distance. In another example, the search component 112 can compute similarity between the new digital signature and the learned digital signatures based on based on a Jaccard distance. However, other mechanisms for computing similarity between the new digital signature and the learned digital signatures can be employed.

In an aspect, the search component 112 can compare the new digital signature to the set of tagged digital signatures stored in the digital signature library 104 before the digital signature is stored in the digital signature library 104. For example, before a digital signature is stored in the digital signature library 104, the search component 112 can determine whether a previously generated data signature that matches the digital signature is stored in the digital signature library 104. In another aspect, the search component 112 can determine that the new digital signatures matches a digital signature from the digital signatures stored in the digital signature library 104 (e.g., the search component 112 can determine that the new digital signatures matches a learned digital signature from the learned digital signatures stored in the digital signature library 104).

The prognostics component 114 can prognose an upcoming event associated with the new digital signature based at least in part on the generated inferences and the matches. For example, the prognostics component 114 can associate the new digital signature with an event in response to a determination that the new digital signature matches a learned digital signature from the learned digital signatures. The prognostics component 114 can also correlate an event with an asset and/or a system associated with the event. In an aspect, the prognostics component 114 can trigger one or more actions in response to a determination that the new digital signature matches a learned digital signature from the learned digital signatures. An action can be, for example, execution of a certain task or a certain function. An action can be external to the system 100. For example, an action can be associated with an asset and/or a system associated with the stored data. In another example, an action can be associated with an analytics process related to the stored data. For example, the learned digital signatures can be employed as conditional statements in analytics that trigger an analytic engine to execute.

The display component 116 can generate a user interface, for display, that outputs the prognoses in a human interpretable format. The display component 116 can render a display to and/or receive data from a display device or component such as a monitor, television, computer, mobile device, web browser or the like. In one example, the prognoses and/or information associated with the prognoses can be presented graphically in an easily comprehensible manner. The prognoses and/or information associated with the prognoses can be presented as one or more of alphanumeric characters, graphics, animations, audio and video. Furthermore, the prognoses and/or information associated with the prognoses can be static or updated dynamically to provide information in real-time as changes or events occur.

The display component 116 can display and/or facilitate display one or more display elements associated with the prognoses. The display component 116 can generate, receive, retrieve or otherwise obtain a graphical element (e.g., a graphical representation) associated with the prognoses. In accordance with one aspect, a graphical element (e.g., a graphical representation) provided by the display component 116 can form all or part of a complete display rendered on a display device. In addition to the graphical representation, one or more items can form part of the display. In one example, the display component 116 can generate a notification associated with the prognoses, a message associated with the prognoses, an icon associated with the prognoses, a thumbnail associated with the prognoses, a dialog box associated with the prognoses, a tool associated with the prognoses, a widget associated with the prognoses, a graph associated with the prognoses, and/or another display element associated with the prognoses. A display element associated with the prognoses can be transparent, translucent or opaque. A display element associated with the prognoses can also be various sizes, various colors, various brightness, and so forth as well as being animated (e.g., for fading in and out, etc.).

In an embodiment, the display component 116 can present information associated with a digital signature via a graph. For example, the display component 116 can present one or more parameters and/or a set of values over time in a graph. The display component 116 can also modify the graph based on user feedback data. For example, a user can progress back and forth through a time axis of the graph. A user can also select a portion of the graph (e.g., a horizontal portion of the graph) via a cursor. By selecting a portion of the graph, a user can add data (e.g., metadata) to a digital signature associated with the graph. For instance, a user can add data associated with an event (e.g., an event associated with the digital signature), add data associated with an asset (e.g., an asset associated with the digital signature), other data associated such as a model, date/time, title, etc. The tagging component 108 can generate and/or update a tag for a digital signature based on data provided by a user via a graph and/or a user interface.

In another implementation, a digital signature can be generated based on information presented by the display component 116. For example, the data signature generation component 106 can employ data received via a display device associated with information provided by the display component 116. In a non-limiting example, the display component 116 can present one or more parameters and/or a set of values over time in a graph. A user can progress back and forth through a time axis of the graph. A user can also select a portion of the graph (e.g., a horizontal portion of the graph) via a cursor. Based on selection of portion of the graph, the data signature generation component 106 can generate a digital signature. For example, a digital fingerprint can be generated based on the portion of the graph that is selected by the user.

While FIG. 1 depicts separate components in the pattern detection component 102, it is to be appreciated that two or more components may be implemented in a common component. Further, it can be appreciated that the design of system 100 and/or the pattern detection component 102 can include other component selections, component placements, etc., to facilitate digital data prognostics.

Figure 2:
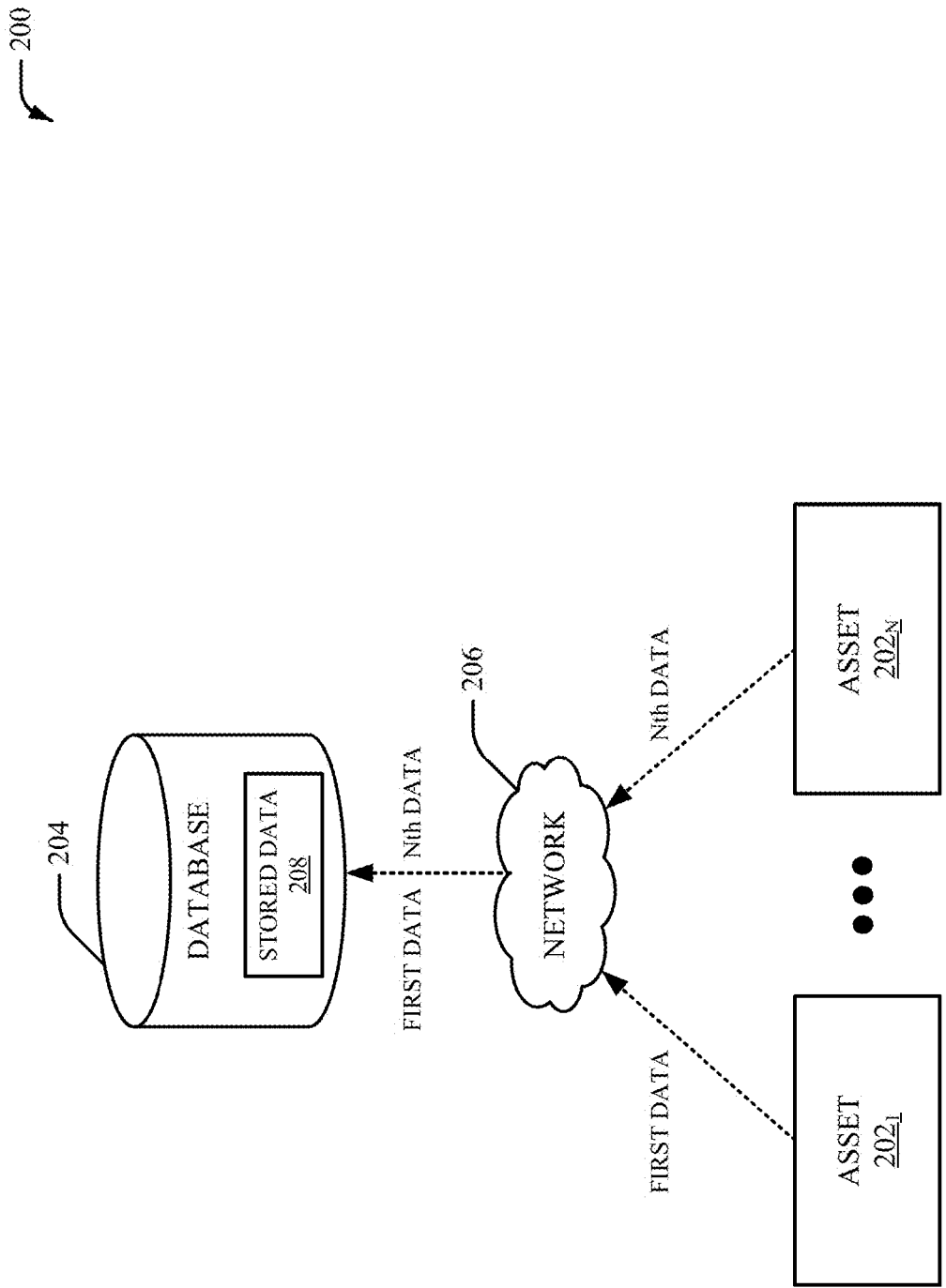
FIG. 2 illustrates an example system for storing data provided by assets, in accordance with various aspects and implementations described herein.

Referring now to FIG. 2, there is illustrated a non-limiting implementation of a system 200 in accordance with various aspects and implementations of this disclosure. The system 200 includes one or more assets $202_{1-N}$ and a database 204. The one or more assets $202_{1-N}$ and the database 204 can be in communication via a network 206. The network 206 can be a communication network, a wireless network, an internet protocol (IP) network, a voice over IP network, an internet telephony network, a mobile telecommunications network and/or another type of network. An asset from the one or more assets $202_{1-N}$ can be a device, a machine, a vehicle, equipment, a controller device (e.g., a programmable logic controller), a Supervisory Control And Data Acquisition (SCADA) device, a meter device, a monitoring device (e.g., a remote monitoring device), a network-connected device, a sensor device, a remote terminal unit, a telemetry device, a user interface device (e.g., a human-machine interface device), a historian device, a computing device, another type of asset, etc. The one or more assets $202_{1-N}$ can also provide data (e.g., coded data) to the database 204 via the network 206.

In an example shown in FIG. 2, a first asset $202_1$ can generate and/or provide first data (e.g., FIRST DATA shown in FIG. 2). Furthermore, an Nth asset $202_N$ can generate and/or provide Nth data (e.g., Nth DATA shown in FIG. 2). In certain implementations, the first asset $202_1$ can be located at a first location (e.g., a first geographic location) and the Nth asset $202_N$ can be located at an Nth location (e.g., an Nth geographic location) that is different than the first location. The first data and the Nth data can be transmitted to the database 204 via the network 206. The first data and the Nth data can be transmitted to the database 204 as coded signals. Then, the first data and the Nth data can be stored in the database 204 as stored data 208. The stored data 208 can correspond to the stored data provided to the pattern detection component 102 (e.g., the stored data shown in FIG. 1). In an aspect, the database 204 can be a set of servers that stores the stored data 208 (e.g., the database 204 can include multiple servers that store the stored data 208).

The one or more assets $202_{1-N}$ can generate and/or provide time-series data. The one or more assets $202_{1-N}$ can also be associated with an audio system, a vibration detection system, a temperature detection system, an image system, a video capturing system, a pressure detection system, a flow rate detection system, an electrical current sensor system, a voltage detector system, a heat loading system and/or another type of system associated with time-series data. Time-series data generated and/or provided by the one or more assets $202_{1-N}$ can be raw data. Furthermore, in certain implementations, the database 204 can process time-series data generated and/or provided by the one or more assets $202_{1-N}$ to generate processed data. Therefore, the stored data 208 can be processed data, in certain implementations. The stored data 208 can be structured data, semi-structured data and/or unstructured data. The stored data 208 can also be stored time-series data. In one example, the database 204 can be associated with a distributed parallel architecture for storing the stored data 208. In another example, the database 204 can be associated with a storage repository for the stored data 208 and/or a processing engine for processing data provided by the one or more assets $202_{1-N}$ into the stored data 208 (e.g., the database 204 can be a data lake).

Figure 3:
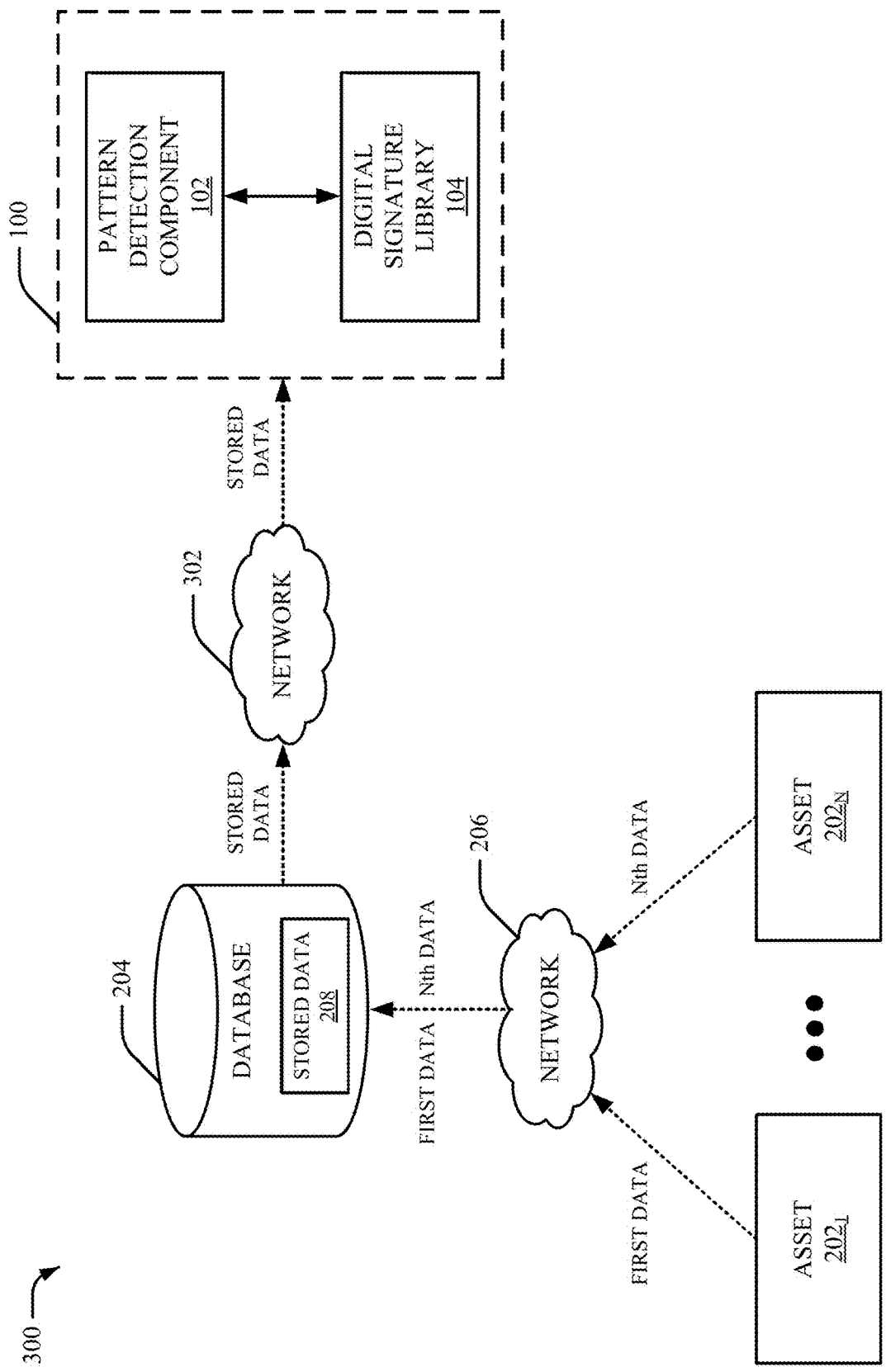
FIG. 3 illustrates an example system for providing stored data to a pattern detection component, in accordance with various aspects and implementations described herein.

Referring to FIG. 3, there is illustrated a non-limiting implementation of a system 300 in accordance with various aspects and implementations of this disclosure. The system 300 includes the one or more assets $202_{1-N}$, the database 204 and the system 100. The system 100 can include at least the pattern detection component 102 and the digital signature library 104. The one or more assets $202_{1-N}$ and the database 204 can be in communication via a network 206. Furthermore, the database 204 and the system 100 (e.g., the database 204 and the pattern detection component 102) can be in communication via a network 302. The network 302 can be a communication network, a wireless network, an IP network, a voice over IP network, an internet telephony network, a mobile telecommunications network and/or another type of network. In an embodiment, the system 100 can receive the stored data 208. For example, the pattern detection component 102 (e.g., the data signature generation component 106 of the pattern detection component 102) can receive the stored data 208. The stored data 208 can be provided to the pattern detection component 102 as a stream of data (e.g., a stream of time-series data). The pattern detection component 102 (e.g., the data signature generation component 106 and/or the tagging component 108 of the pattern detection component 102) can generate one or more digital signatures (e.g., one or more digital signatures for storage in the digital signature library 104) based on the stored data 208. In an alternate embodiment, the system 100 can be in direct communication with the database 204. Therefore, the system 100 can receive the stored data 208 without the network 302. In an aspect, pattern detection component 102 (e.g., the prognostics component 114 of the pattern detection component 102) can correlate an event (e.g., an event associated with a digital signature) with an asset from the assets $202_{1-N}$. In another aspect, the digital signature library 104 can be employed as a predictive model for abnormalities, patterns and/or events associated with the stored data 208 and/or the one or more assets $202_{1-N}$.

Compared to a conventional system, the system 100 that includes the pattern detection component 102 and the digital signature library 104 can provide improved accuracy, reduced time, greater capabilities and/or greater adaptability for identifying anomalies, patterns and/or events associated with the stored data 208. Management of the stored data 208 and/or the one or more assets $202_{1-N}$ associated with the stored data 208 can also be improved by employing the system 100 that includes the pattern detection component 102 and the digital signature library 104. Moreover, by employing the system 100 that includes the pattern detection component 102 and the digital signature library 104, performance of the one or more assets $202_{1-N}$ can be improved, costs associated with the one or more assets $202_{1-N}$ can be reduced, and risks associated with the one or more assets $202_{1-N}$ can be minimized.

It is to be appreciated that technical features of the pattern detection component 102 and processing of the stored data 208 that facilitate generation of the data signatures, identification of events in the stored data 208, etc. are highly technical in nature and not abstract ideas. Processing threads of the pattern detection component 102 that process the stored data 208 cannot be performed by a human (e.g., are greater than the capability of a single human mind). For example, the amount of the stored data 208 processed, the speed of processing of the stored data 208 and/or the data types of the stored data 208 processed by the pattern detection component 102 over a certain period of time can be respectively greater, faster and different than the amount, speed and data type that can be processed by a single human mind over the same period of time. Furthermore, the stored data 208 processed by the pattern detection component 102 can be raw data and/or compressed data associated with the assets $202_{1-N}$. Moreover, the pattern detection component 102 can be fully operational towards performing one or more other functions (e.g., fully powered on, fully executed, etc.) while also processing the stored data 208.

Figure 4:
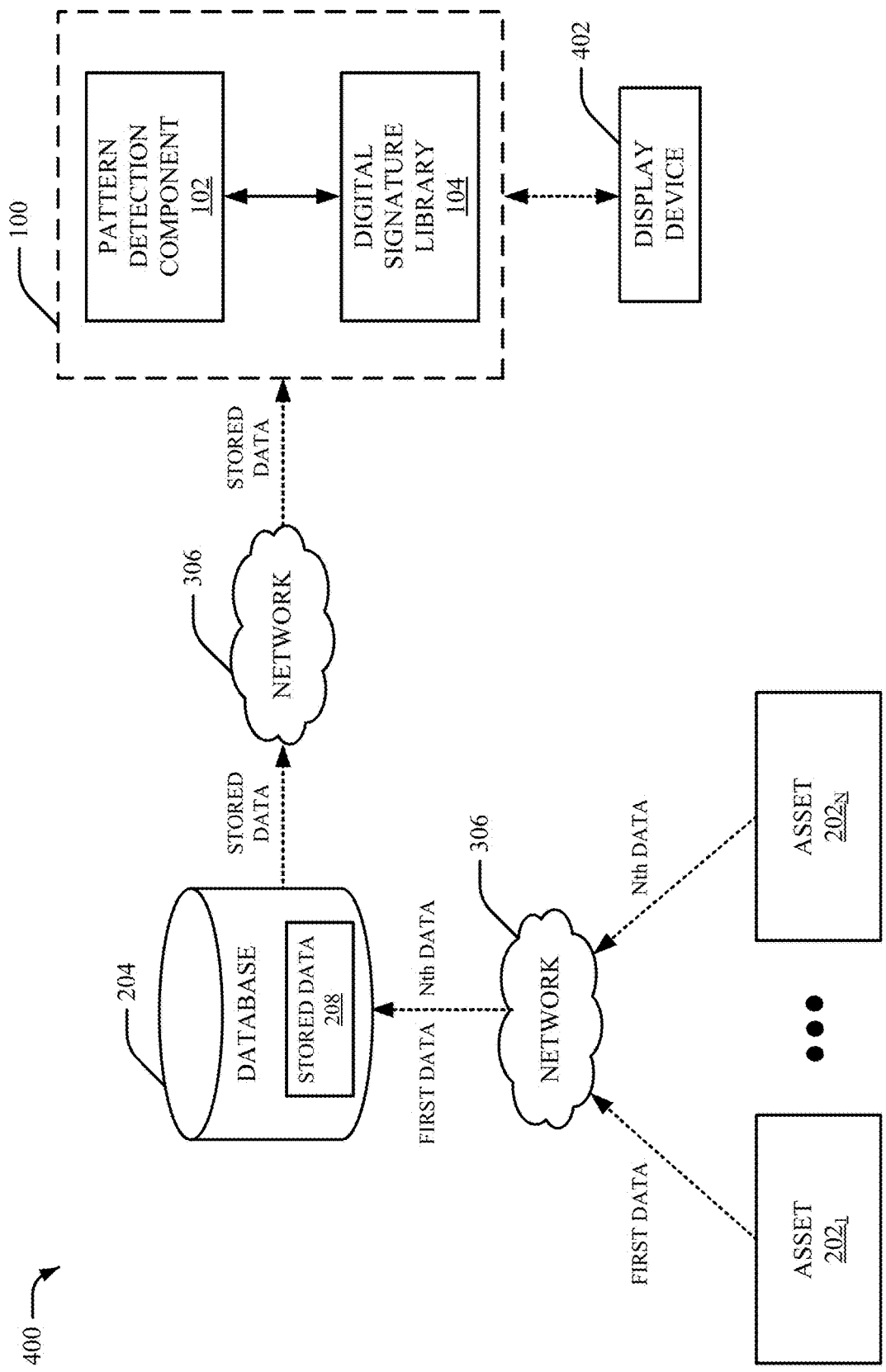
FIG. 4 illustrates an example system for displaying information provided by a pattern detection component, in accordance with various aspects and implementations described herein.

Referring to FIG. 4, there is illustrated a non-limiting implementation of a system 400 in accordance with various aspects and implementations of this disclosure. The system 400 includes the one or more assets $202_{1-N}$, the database 204, the system 100 and a display device 402. The system 100 can include at least the pattern detection component 102 and the digital signature library 104. The display device 402 can be communicatively coupled to the system 100. The display device 402 can be implemented separate from the system 100. Alternatively, the display device 402 and/or a device associated with the display device 402 can include the system 100. The display device 402 can be associated with a display, a monitor and/or a user interface. Furthermore, the display device 402 can be a computing device and/or can be included in a computing device such as, but not limited to, a smart device, a smart phone, a mobile device, a handheld device, a tablet, a computer, a desktop computer, a laptop computer, a monitor device, a portable computing device or another type of computing device. The display component 116 can generate a user interface for presentation on the display device 402. The display device 402 can also present content provided by and/or generated by the display component 116. For example, the display device 402 can present one or more display elements related to a prognoses associated with the stored data 208.

In an aspect, the display device 402 can present information regarding abnormalities, patterns and/or events determined by the system 100 based on the stored data 208. The display device 402 can also present information regarding the one or more assets $202_{1-N}$ based on abnormalities, patterns and/or events associated with the stored data 208. For example, the pattern detection component 102 can employ digital signatures and/or tags stored in the digital signature library 104, as well as learning and correlations associated therewith, to identify abnormalities, patterns and/or events associated with the stored data 208. Digital signatures and/or tags stored in the digital signature library 104 can further be employed by the pattern detection component 102 to correlate the identified abnormalities, patterns and/or events with the one or more assets $202_{1-N}$. The display device 402 can render graphical elements associated with the abnormalities, patterns and/or events determined by the system 100. The display device 402 can additionally or alternatively render graphical elements associated with the one or more assets $202_{1-N}$. These graphical elements can be in a human interpretable format to allow a user employing the display device 402 to interpret the abnormalities, patterns and/or events associated with the stored data 208, as well as a description and/or rendering of asset(s) from the one or more assets $202_{1-N}$ that are affected by the abnormalities, patterns and/or events.

The display device 402 can also allow the stored data 208 to be presented via a user interface as time-series data and/or in real-time. For instance, the stored data 208 can be presented as a graphical representation of time-series data that is formatted based on time and parameter(s) associated with the stored data 208. A user can then monitor the stored data 208 via the graphical representation of the stored data 208. A user can also detect patterns associated with the graphical representation of the stored data 208 such as, for example, peaks associated with the stored data 208, troughs associated with the stored data 208, a rate of change associated with the stored data 208, a length of time between a first peak associated with the stored data 208 and a second peak associated with the stored data 208, etc. The patterns detected by the user via the graphical representation of the stored data 208 can be employed by the system 100 as a digital signature. The user can also add a tag to a digital signature that is generated based on the graphical representation of the stored data 208. As such, a user can provide user input data to facilitate generation of digital signatures and/or tags for storage in the digital signature library 104.

In an non-limiting example, the first asset $202_1$ can be associated with a first assembly line (e.g., in a factory) and the Nth asset $202_N$ can be associated with an Nth assembly line that is different than the first assembly line. The first assembly line associated with the first asset $202_1$ and the Nth assembly line associated with the Nth asset $202_N$ can both manufacture a corresponding product (e.g., an engine, a semiconductor product, another type of product, etc.). Also, the first assembly line associated with the first asset $202_1$ and the Nth assembly line associated with the Nth asset $202_N$ can be configured in a similar manner (e.g., with corresponding layouts, with corresponding robots, with corresponding controller devices, with corresponding sensors, etc.). During a first assembly process associated with the first asset $202_1$, the first asset $202_1$ can generate the first data. Similarly, during an Nth assembly process associated with the Nth asset $202_N$, the Nth asset $202_N$ can generate the Nth data. Therefore, the first data and the Nth data, generated during the first assembly process and the Nth assembly process, can be transmitted to the database 204 via the network 306 and stored as the stored data 208. The first data and the Nth data can be unstructured data. In an example, a first product manufactured by the first asset $202_1$ can be associated with a defect that is not present in an Nth product manufactured by the Nth asset $202_N$. A conventional system would generally be unable to identify a cause for the defect in the first product manufactured by the first asset $202_1$ using the first data and the Nth data since gleaning insights from unstructured data associated with the first data and the Nth data is generally time consuming and/or not easy to achieve.

In contrast, the system 100 (e.g., the pattern detection component 102 and the digital signature library 104) can employ the stored data 208 associated with the first asset $202_1$ and the Nth asset $202_N$ to successfully identify a cause for the defect in the first product manufactured by the first asset $202_1$. For example, the system 100 (e.g., the pattern detection component 102 and the digital signature library 104) can generate digital signatures and/or tags based on the stored data 208 associated with the first assembly line and the Nth assembly line, perform learning and/or generate inferences regarding the digital signatures associated with the first assembly line and the Nth assembly line, etc., to prognose an event associated with the defect in the first product manufactured by the first asset $202_1$. In certain implementations, the system 100 (e.g., the pattern detection component 102) can also identify any correlations between the first asset $202_1$ and the Nth asset $202_N$ with respect to operators associated with the first asset $202_1$ and the Nth asset $202_N$. It is to be appreciated that the system 100 can also employ other techniques and/or aspects, as more fully disclosed herein, to prognose an event associated with the defect in the first product manufactured by the first asset $202_1$. Information associated with the event and/or the first asset $202_1$ can be presented on a user interface associated with the display device 402. In an implementation, the system 100 (e.g., the pattern detection component 102) can generate multiple possible causes and/or events associated with the defect in the first product manufactured by the first asset $202_1$. As such, the multiple possible causes and/or events associated with the defect in the first product can be presented as different graphical elements on a user interface associated with the display device 402 to allow a user to further investigate an exact cause for the defect in the first product. In one example, a ranked list of the multiple possible causes and/or events can be presented on the user interface associated with the display device 402, where the ranked list is weighted based on other data, other inferences, other learning and/or other digital signatures associated with the first asset $202_1$. As such, performance of the first assembly line associated with the first asset $202_1$ can be improved and/or costs related to the first assembly line associated with the first asset $202_1$ can be reduced.

Figure 5:
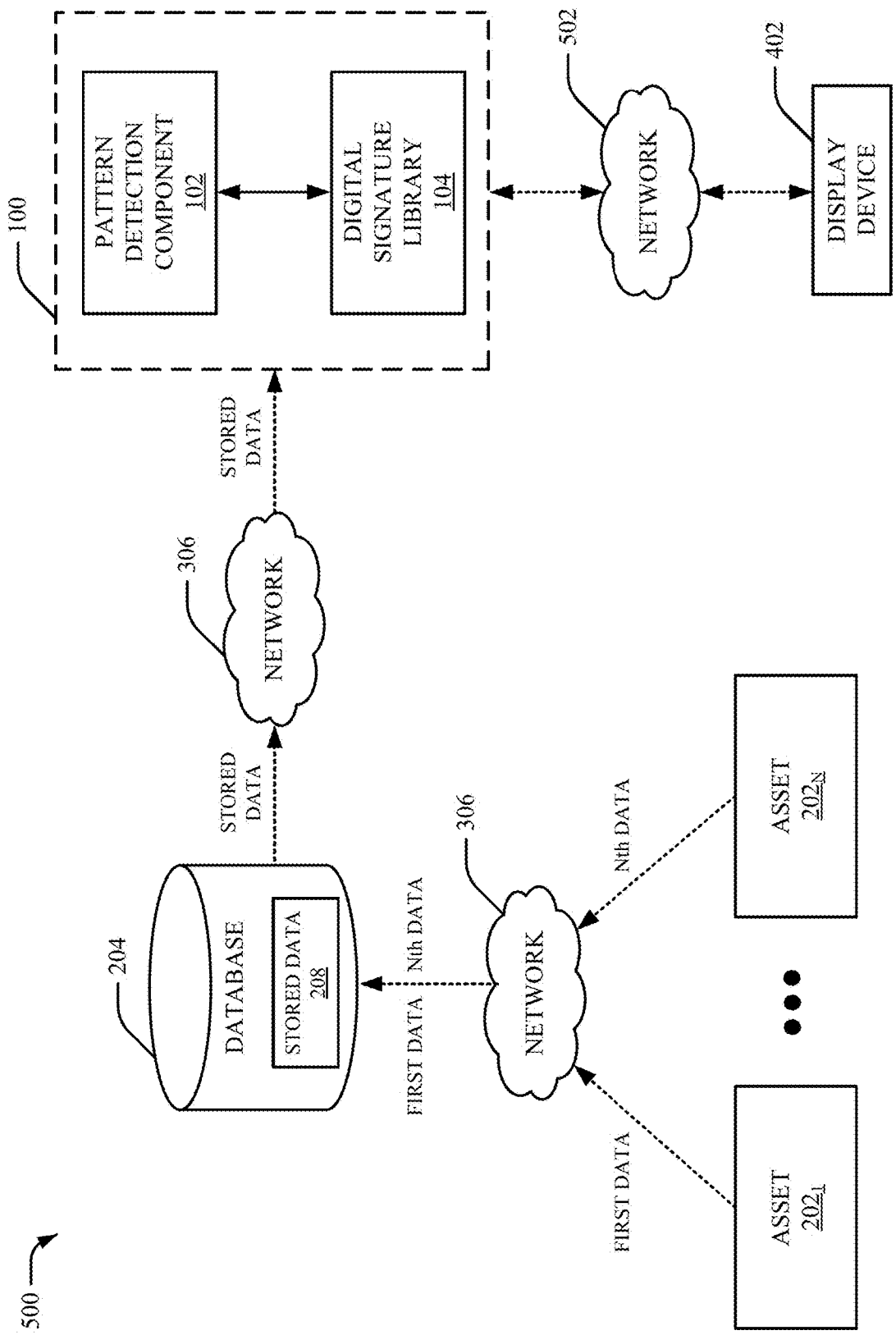
FIG. 5 illustrates another example system for displaying information provided by a pattern detection component, in accordance with various aspects and implementations described herein.

Referring to FIG. 5, there is illustrated a non-limiting implementation of a system 400 in accordance with various aspects and implementations of this disclosure. The system 500 includes the one or more assets $202_{1-N}$, the database 204, the system 100 and a display device 402. The system 100 can include at least the pattern detection component 102 and the digital signature library 104. In the embodiment shown in FIG. 5, the display device 402 can be in communication with the system 100 via a network 502. The network 502 can be a communication network, a wireless network, an IP network, a voice over IP network, an internet telephony network, a mobile telecommunications network and/or another type of network. The display device 402 can present content provided by the display component 116 via the network 502. For example, the display device 402 can receive one or more display elements and/or information regarding one or more display elements via the network 502. The one or more display elements and/or the information received via the network 502 can be related to a prognoses associated with the stored data 208. In one example, the display device 402 (e.g., a user interface presented on the display device 402) can be integrated with a web-based application in communication with the system 100 via the network 502. The web-based application can allow abnormalities, patterns and/or events determined by the system 100 to be visualized in human interpretable format, as described above in connection with at least FIG. 5. Furthermore, the web-based application can allow a user to monitor and/or analyze the stored data 208 via a graphical representation of the stored data 208, as described above in connection with at least FIG. 5.

Figure 6:
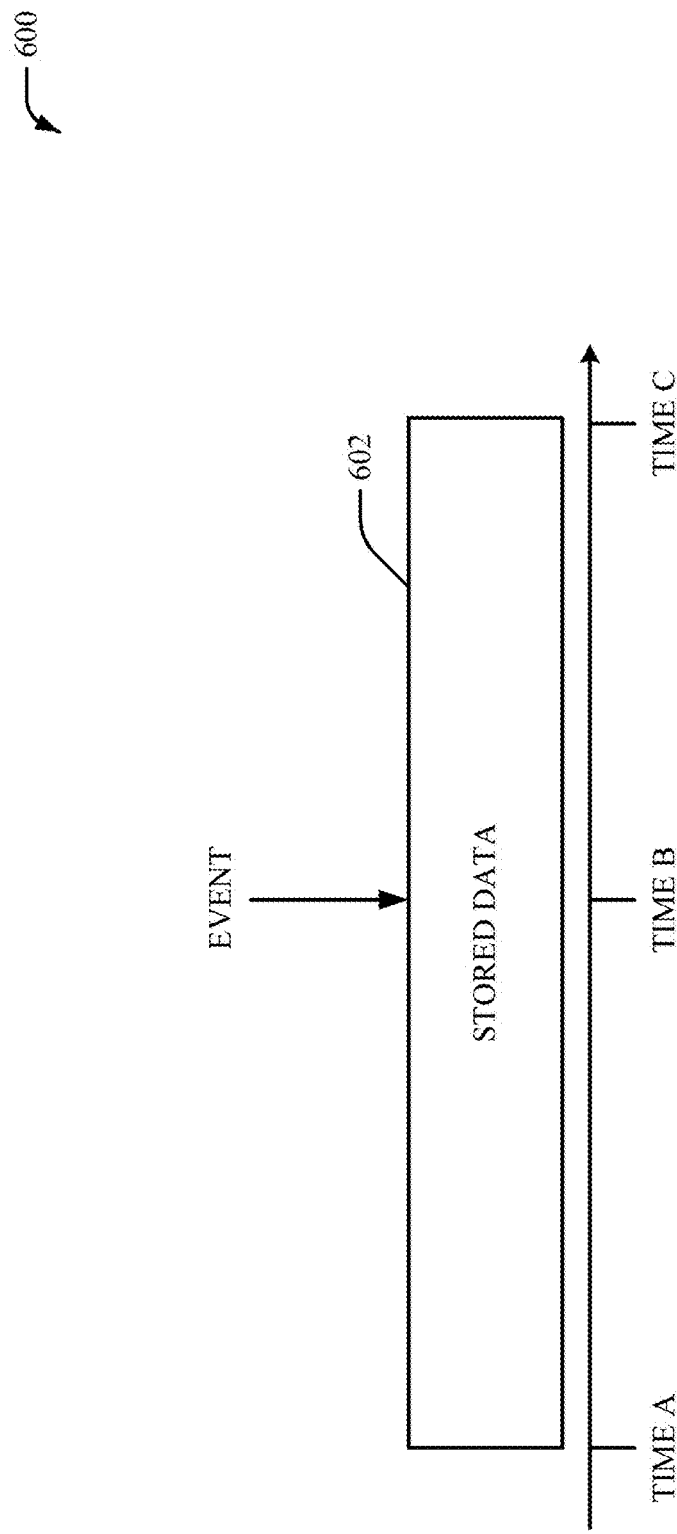
FIG. 6 illustrates an example system associated with stored data, in accordance with various aspects and implementations described herein.

Referring now to FIG. 6, there is illustrated a non-limiting implementation of a system 600 in accordance with various aspects and implementations of this disclosure. The system 600 includes stored data 602. The stored data 602 can be associated with, for example, the stored data 208 and/or stored data received by the pattern detection component 102. The stored data 602 can also be transmitted from a database (e.g., the database 204) and received by the pattern detection component 102. The stored data 602 can be a portion of time-series data associated with a time interval that starts at time A and ends at time C. The stored data 602 can also be associated with an event (e.g., an extrinsic event) that occurs at time B. The event that occurs at time B can be associated with a pattern and/or a graphical characteristic associated with the stored data 602. For example, the event that occurs at time B can be associated with a peak in the stored data 602, a trough associated with the stored data 602, a particular rate of change associated with the stored data 602 and/or another pattern or graphical characteristic associated with the 602. A pattern and/or a graphical characteristic associated with the event that occurs at time B can be identified by the data signature generation component 102. Alternatively, user input data received by the data signature generation component 106 can identify a pattern and/or a graphical characteristic associated with the event that occurs at time B. For example, a user can identify a pattern and/or a graphical characteristic associated with the event that occurs at time B via a user interface (e.g., a user interface rendered on the display device 402).

Figure 7:
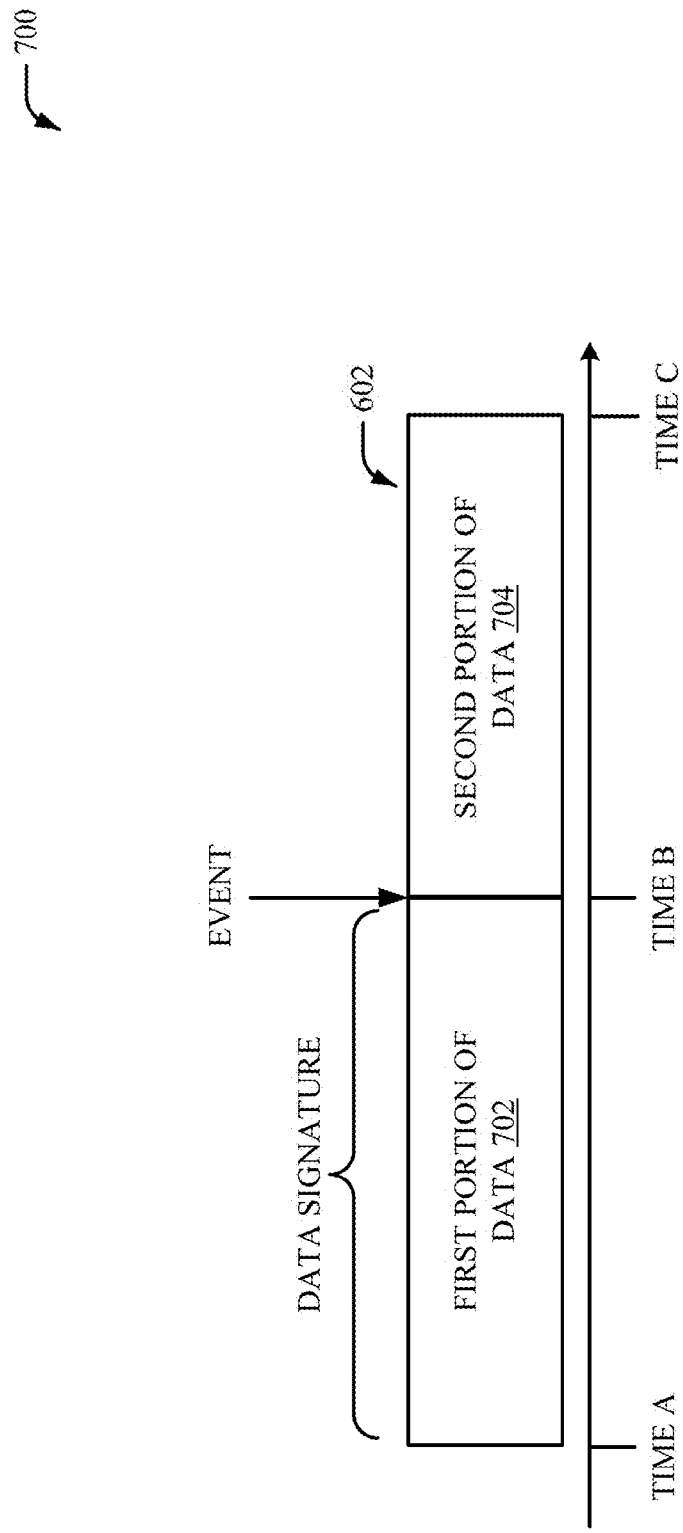
FIG. 7 illustrates another example system associated with stored data, in accordance with various aspects and implementations described herein.

Referring now to FIG. 7, there is illustrated a non-limiting implementation of a system 700 in accordance with various aspects and implementations of this disclosure. The system 700 includes the stored data 602 described in relation to FIG. 6. However, the stored data 602 shown in FIG. 7 can represent the stored data after being processed by the pattern detection component 102. The stored data 602 shown in FIG. 7 can include a first portion of data 702 and a second portion of data 704. The first portion of data 702 can be associated with a data signature (e.g., a digital fingerprint). The first portion of data 702 can also include a sequence of values for one or more parameters during an interval of time (e.g. a time interval between time A and time B) prior to the event at time B. For example, the first portion of data 702 can be a portion of the stored data 602 that is associated with a time interval before the event (e.g., a time interval between time A and time B). Therefore, the first portion of data 702 can represent a data pattern before the event occurs (e.g., a data pattern leading up to the event). In certain implementations, the first portion of data 702 can additionally include another sequence of values for the one or more parameters during another interval of time after the event at time B. For example, the first portion of data 702 can additionally include another sequence of values for the one or more parameters during another interval of time that begins at time B and ends at a time value before time C. Accordingly, a 'snapshot' of the stored data 602 can be created as a data signature (e.g., a digital fingerprint) associated with first portion of data 702.

In an aspect, a data signature (e.g., a digital fingerprint) associated with the first portion of data 702 can be stored in the digital signature library 104. A data signature (e.g., a digital fingerprint) associated with the first portion of data 702 can also be tagged with the event associated with time B. Furthermore, a data signature (e.g., a digital fingerprint) associated with the first portion of data 702 can be employed by the pattern detection component 102 (e.g., the search component 112 of the pattern detection component 102) to identify an upcoming event related to the event associated with time B. For example, a data signature (e.g., a digital fingerprint) associated with the first portion of data 702 can be employed by the pattern detection component 102 (e.g., the search component 112 of the pattern detection component 102) to identify corresponding events associated with stored data 208 that is stored in the database 204. In another aspect, the pattern detection component 102 (e.g., the data signature generation component 106 of the pattern detection component 102) can determine a time period (e.g., a time period from time A to time B) that occurs prior to the event at time B to facilitate generation of the data signature (e.g., the digital fingerprint) associated with the first portion of data 702.

Figure 8:
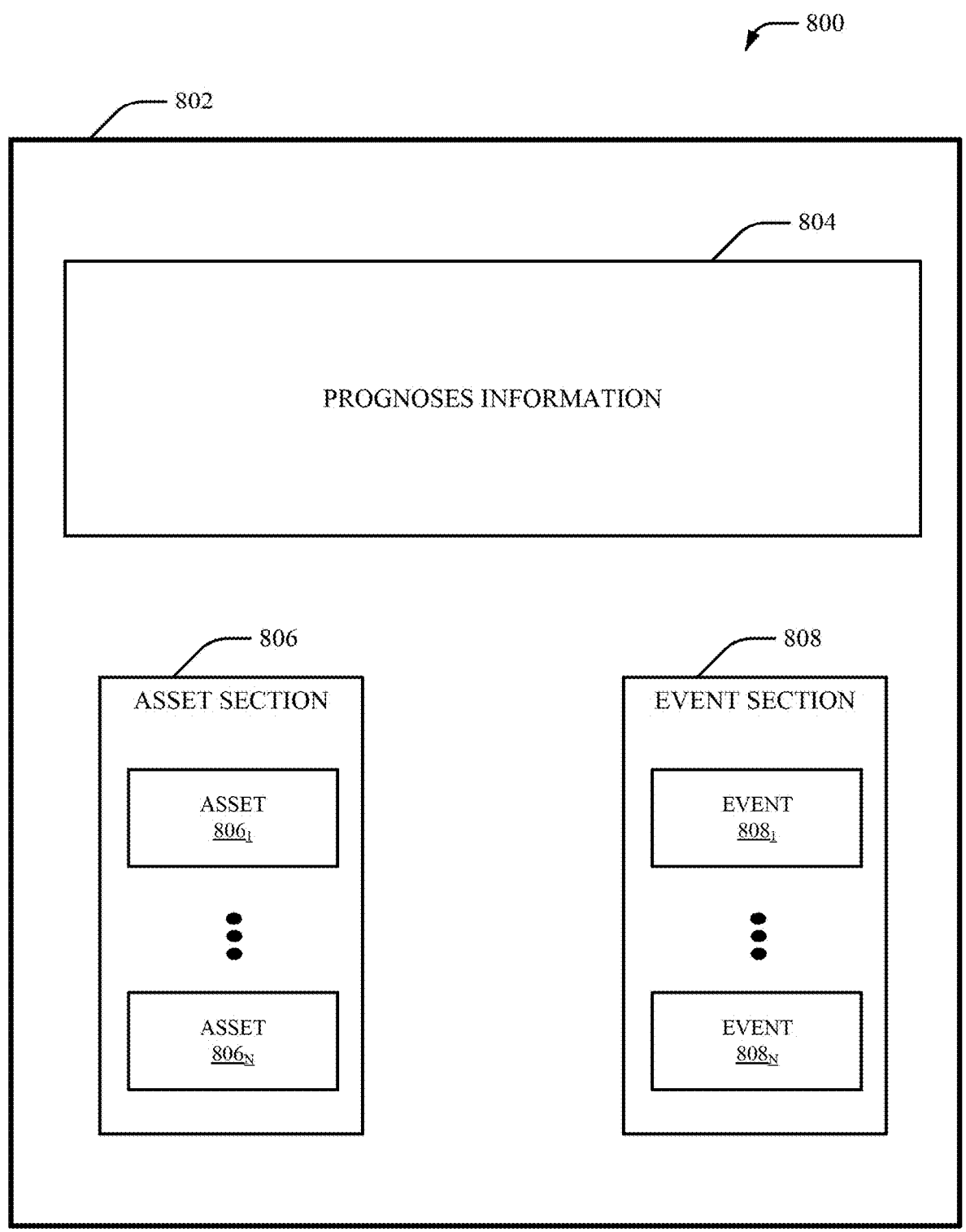
FIG. 8 illustrates an example user interface in connection with a pattern detection component, in accordance with various aspects and implementations described herein.

Referring to FIG. 8, there is illustrated a non-limiting implementation of a system 800, in accordance with various aspects and implementations of this disclosure. In an aspect, the system 800 can be associated with the display component 116 and/or a display device. The system 800 illustrates an example user interface 802. The user interface 802 can be a graphical user interface that presents (e.g., displays) graphical elements. In one example, the user interface 802 can be associated with an industrial Internet application (e.g., a cloud-based PaaS). The user interface 802 can be presented on a display of a display device such as, but not limited to, a computing device, a smart device, a smart phone, a mobile device, a handheld device, a tablet, a computer, a desktop computer, a laptop computer, a monitor device, a portable computing device or another type of display device. In an aspect, the user interface 802 can present prognoses information 804. The prognoses information 804 can be associated with information generated by the prognostics component 114. For example, the prognoses information 804 can present information related to an upcoming event associated with a digital signature. The prognoses information 804 can be presented in a human interpretable format. For example, the prognoses information 804 can be presented as a graphical element such as, but not limited to, a notification, a message, an icon, a thumbnail, a dialog box, an interactive tool, a widget, a graph or another type of graphical element. The prognoses information 804 can also be related to information provided by an asset section 806 of the user interface 802 and/or an event section 808 of the user interface 802. The asset section 806 can present information for various assets 806$_{1-N}$ that provide data associated with the prognoses information 804. The information for the assets 806$_{1-N}$ can, for example, correspond to the assets 202$_{1-N}$. The event section 808 can present information for various events 808$_{1-N}$ associated with the prognoses information 804. The information for various the events 808$_{1-N}$ can, for example, correspond to extrinsic events identified based on data provided by the assets 806$_{1-N}$. The user interface 802 can also facilitate analytics, asset performance management and/or optimization of operations associated with the prognoses information 804, the assets 806$_{1-N}$ and/or the events 808$_{1-N}$. In an aspect, the user interface 802 can allow a user to view, analyze, tag and/or manage data in real-time. It is to be appreciated that the user interface 802 is merely an example. Therefore, the location and/or content of the prognoses information 804, the asset section 806 and/or the event section 808 can be varied. Furthermore, the user interface 802 can include other features, content and/or functionalities not shown in FIG. 8.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 9:
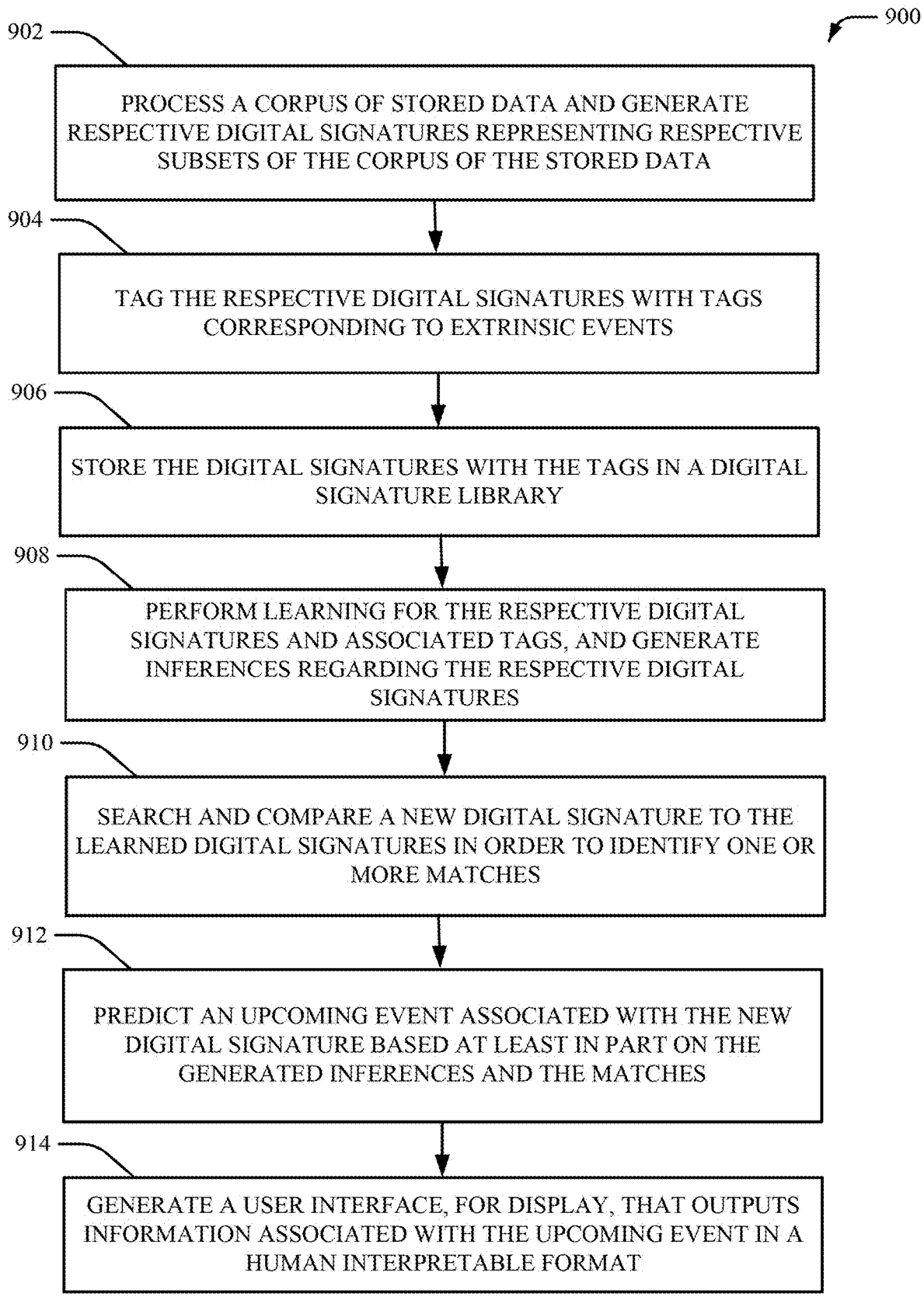
FIG. 9 depicts a flow diagram of an example method for identifying, predicting and/or managing an event associated with a corpus of stored data, in accordance with various aspects and implementations described herein.
Figure 10:
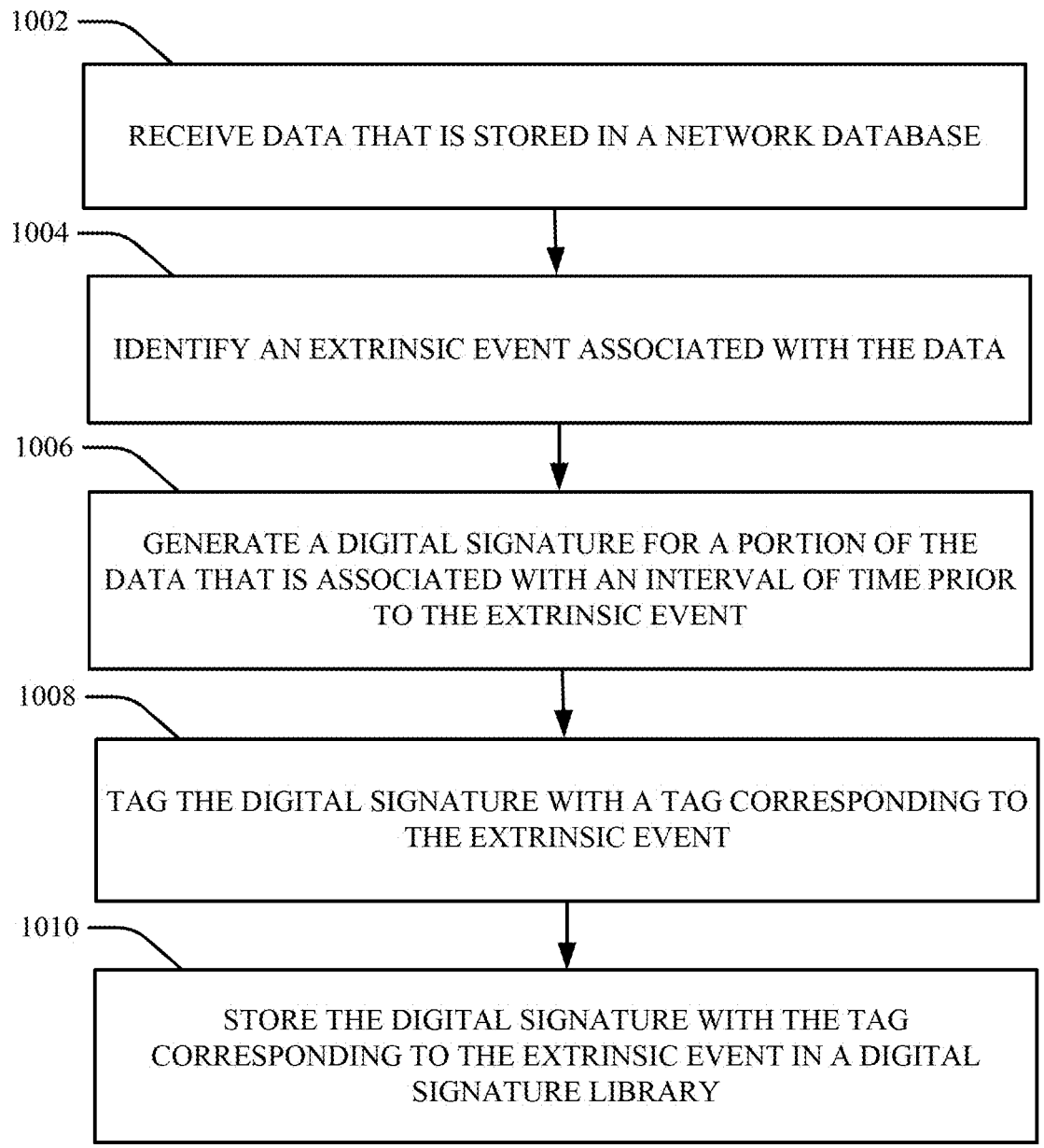
FIG. 10 depicts a flow diagram of an example method for generating and/or storing digital signatures, in accordance with various aspects and implementations described herein.
Figure 11:
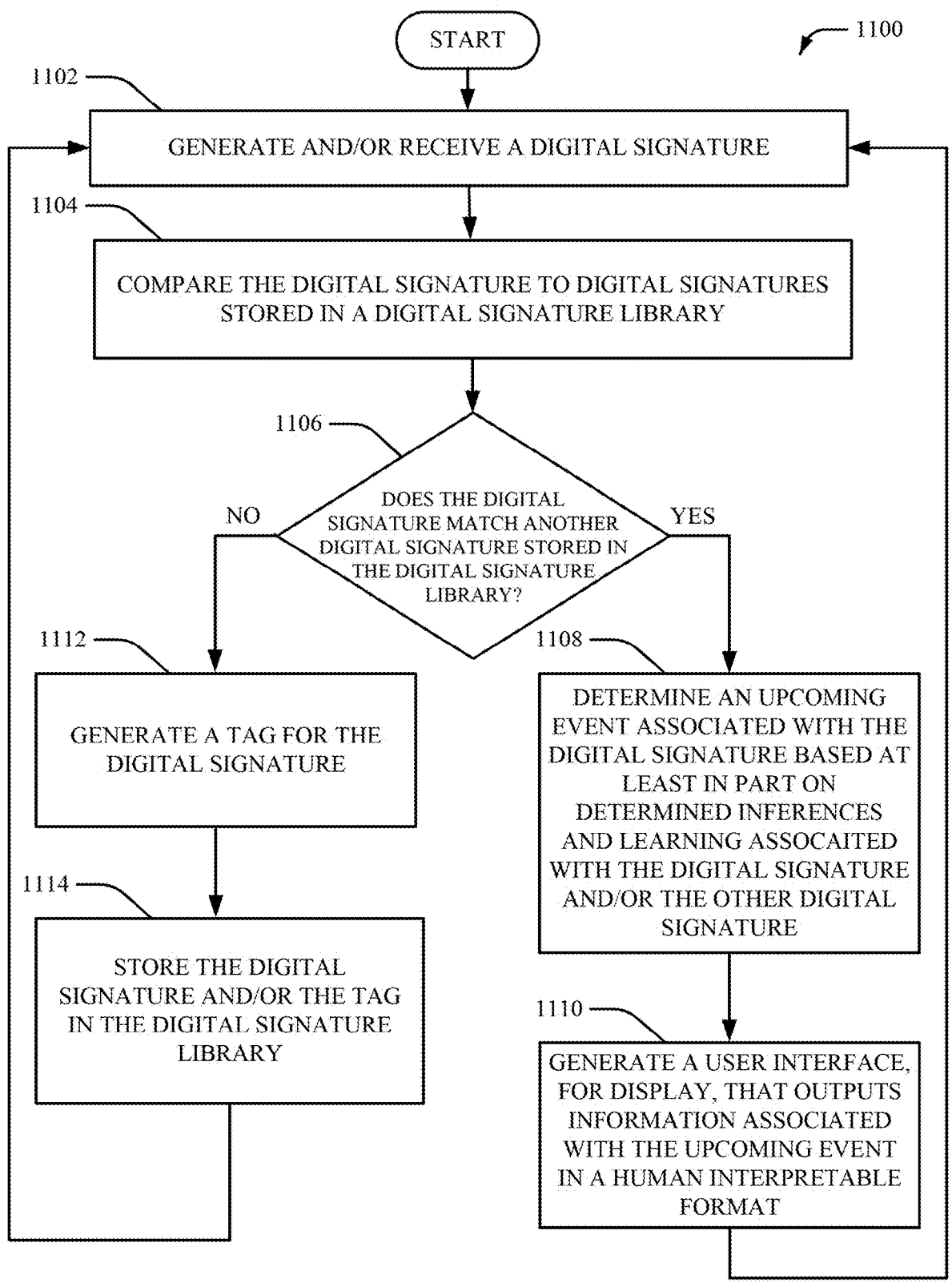
FIG. 11 depicts a flow diagram of an example method for employing digital signatures to identify, predict and/or manage an event associated with stored data, in accordance with various aspects and implementations described herein.

FIGS. 9-11 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 9, there illustrated is a methodology 900 for identifying, predicting and/or managing an event associated with a corpus of stored data, according to an aspect of the subject innovation. As an example, the methodology 900 can be utilized in various applications, such as, but not limited to, industrial systems, aviation systems, manufacturing systems, factory systems, energy management systems, power grid systems, water supply systems, transportation systems, healthcare systems, refinery systems, media systems, research systems, financial systems, data-driven prognostics systems, machine learning systems, neural network systems, network systems, computer network systems, communication systems, router systems, server systems, high availability server systems (e.g., Telecom server systems), Web server systems, file server systems, data server systems, disk array systems, powered insertion board systems, cloud-based systems, PaaS systems, asset performance management systems, etc. At 902, a corpus of stored data is processed (e.g., by a data signature generation component 106) and respective digital signatures representing respective subsets of the corpus of the stored data are generated (e.g., by a data signature generation component 106). For example, the stored data can be received from a database (e.g., a network of databases) via a network. Respective digital signatures can include respective portions of the stored data. A data signature can be a digital fingerprint that encodes a portion of the stored data (e.g., a sequence of data values associated with the stored data). A digital signature can also be associated with a digital pattern for the portion of the stored data. At 904, the respective digital signatures are tagged (e.g., by a tagging component 108) with tags corresponding to extrinsic events. For example, a tag can identify and/or provide information for an extrinsic event associated with a digital signature. At 906, the digital signatures with the tags are stored (e.g., by a data signature generation component 106 and/or a tagging component 108) in a digital signature library. For example, the digital signatures with the tags can be stored in a database that is indexed and/or formatted as a digital signature library.

At 908, learning for the respective digital signatures and associated tags is performed (e.g., by an artificial intelligence component 110), and inferences regarding the respective digital signatures are generated (e.g., by an artificial intelligence component 110). For example, one or more machine learning techniques can be performed to facilitate the learning and the inferences for the respective digital signatures. Based on the learning and the inferences for the respective digital signatures, learned digital signatures can be generated and/or stored in the digital signature library. At 910, a new digital signature is searched and compared to the learned digital signatures (e.g., by a search component 112) in order to identify one or more matches. For example, a new digital signature can be compared to the learned digital signatures stored in the digital signature library based on one or more pattern recognition techniques and/or one or more statistical analysis techniques. At 912, an upcoming event associated with the new digital signature is predicted (e.g., by prognostics component 114) based at least in part on the generated inferences and the matches. For example, in response to a determination that the new digital signature matches a learned digital signature stored in the digital signature library, an event associated with the learned digital signature (e.g., the learned digital signature that matches the new digital signature) can be identified and/or employed to determine the upcoming event. At 914, a user interface for display is generated (e.g., by a display component 116) that outputs information associated with the upcoming event in a human interpretable format. For example, a graphic element that presents information associated with the upcoming event can be rendered on a display associated with a display device.

Referring to FIG. 10, there illustrated is a methodology 1000 for generating and/or storing digital signatures, according to an aspect of the subject innovation. At 1002, data that is stored in a network database is received (e.g., by a data signature generation component 106). For example, the network database can receive the data from one or more assets in wireless communication with the network database. At 1004, an extrinsic event associated with the data is identified (e.g., by a data signature generation component 106). For example, a pattern in the data can be identified. Furthermore, based on the pattern in the data, an extrinsic event associated with the one or more assets and/or a system associated with the one or more assets can be identified. At 1006, a digital signature is generated (e.g., by a data signature generation component 106) for a portion of the data that is associated with an interval of time prior to the extrinsic event. For example, a sequence of data prior to the pattern in the data and/or a data value in the data associated with the extrinsic event can be employed to generate a digital signature. The digital signature can be a digital fingerprint. At 1008, the digital signature is tagged (e.g., by a tagging component 108) with a tag corresponding to the extrinsic event. For example, information that identifies and/or describes the extrinsic event can be appended to and/or associated with the digital signature. At 1010, the digital signature with the tag corresponding to the extrinsic event is stored (e.g., by a data signature generation component 106 and/or a tagging component 108) in a digital signature library. For example, the digital signature and/or the tag can be stored in a database that is different than the network database.

Referring to FIG. 11, there illustrated is a methodology 1100 for employing digital signatures to identify, predict and/or manage an event associated with stored data, according to an aspect of the subject innovation. At 1102, a digital signature is generated and/or received (e.g., using a data signature generation component 106). For example, a digital fingerprint for a portion of stored data (e.g., a sequence of data values for stored data) can be generated and/or received. At 1104, the digital signature is compared to digital signatures stored in a digital signature library (e.g., using an artificial intelligence component 110 and/or a search component 112). For example, the digital signature can be compared to previously generated digital signatures stored in a digital signature library.

At 1106, it is determined whether the digital signature matches another digital signature stored in the digital signature library (e.g., using an artificial intelligence component 110 and/or a search component 112). For example, further to the comparison between the digital signature and digital signatures stored in the digital library, it is determined whether the digital signature matches another digital signature stored in the digital signature library based on one or more artificial intelligence techniques, one or more pattern recognition techniques, one or more statistical analysis techniques and/or one or more other comparison techniques.

If yes, the methodology 1100 proceeds to 1108. At 1108, an upcoming event associated with the digital signature is determined (e.g., using a prognostics component 114) based at least in part on determined inferences and learning associated with the digital signature and/or the other digital signature. For example, the upcoming event can be determined based on an event associated with the other digital signature. Then, the methodology 1100 proceeds to 1110. At 1110, a user interface that outputs information associated with the upcoming event in a human interpretable format is generated for display (e.g., using a display component 116). The methodology 1100 then returns to 1102. For example, a graphic element associated with the information for the upcoming event can be presented on a display.

If no, the methodology 1100 proceeds to 1112. At 1112, a tag is generated for the digital signature (e.g., using a tagging component 108). For example, an event for the digital signature can be associated with the digital signature. Then, the methodology 1100 proceeds to 1114. At 1114, the digital signature and/or the tag is stored in the digital signature library (e.g., using a data signature generation component 106 and/or a tagging component 108). For example, the digital signature can be added to digital signatures stored in the digital signature library. Afterwards, the methodology 1100 returns to 1102.

Figure 12:
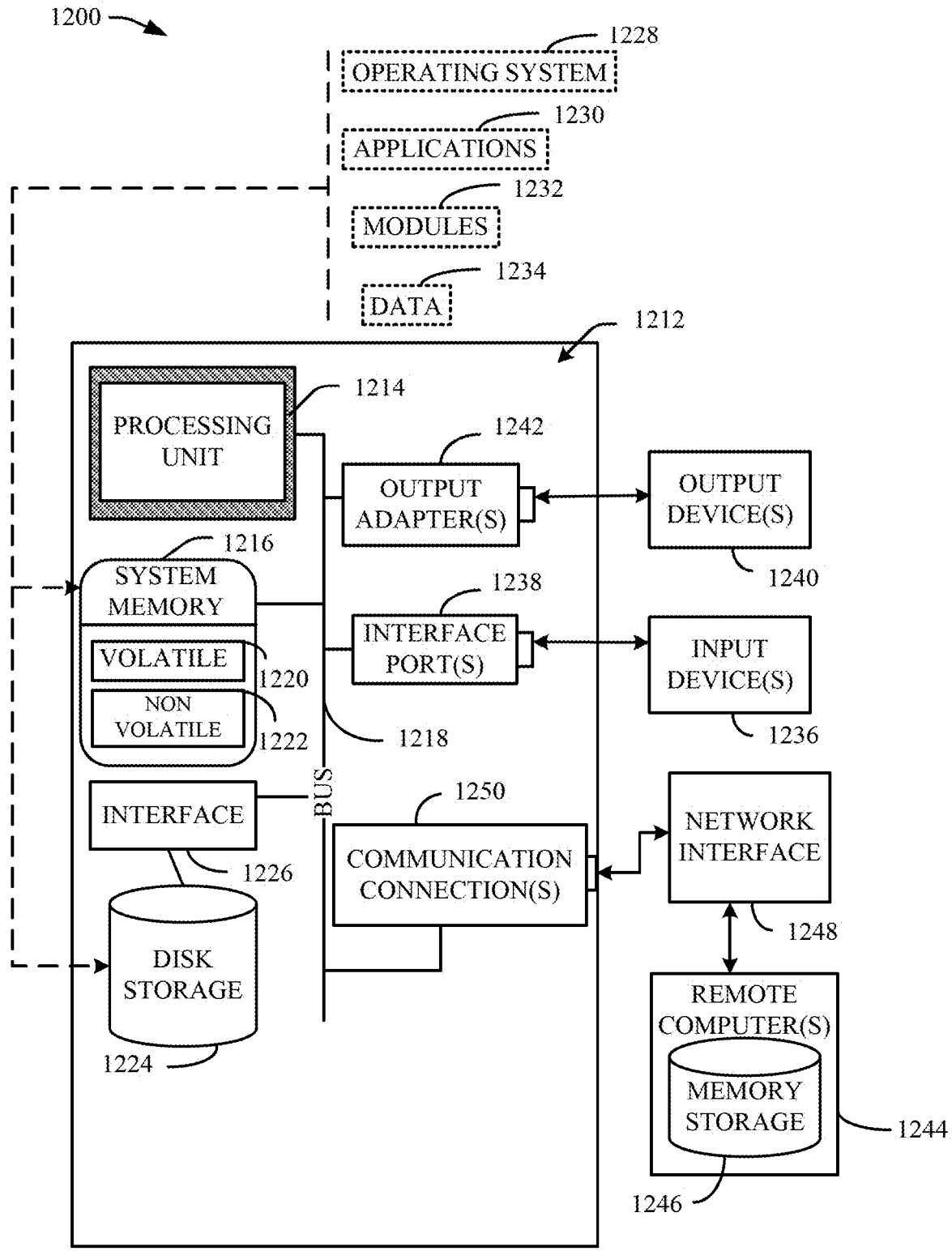
FIG. 12 is a schematic block diagram illustrating a suitable operating environment.
Figure 13:
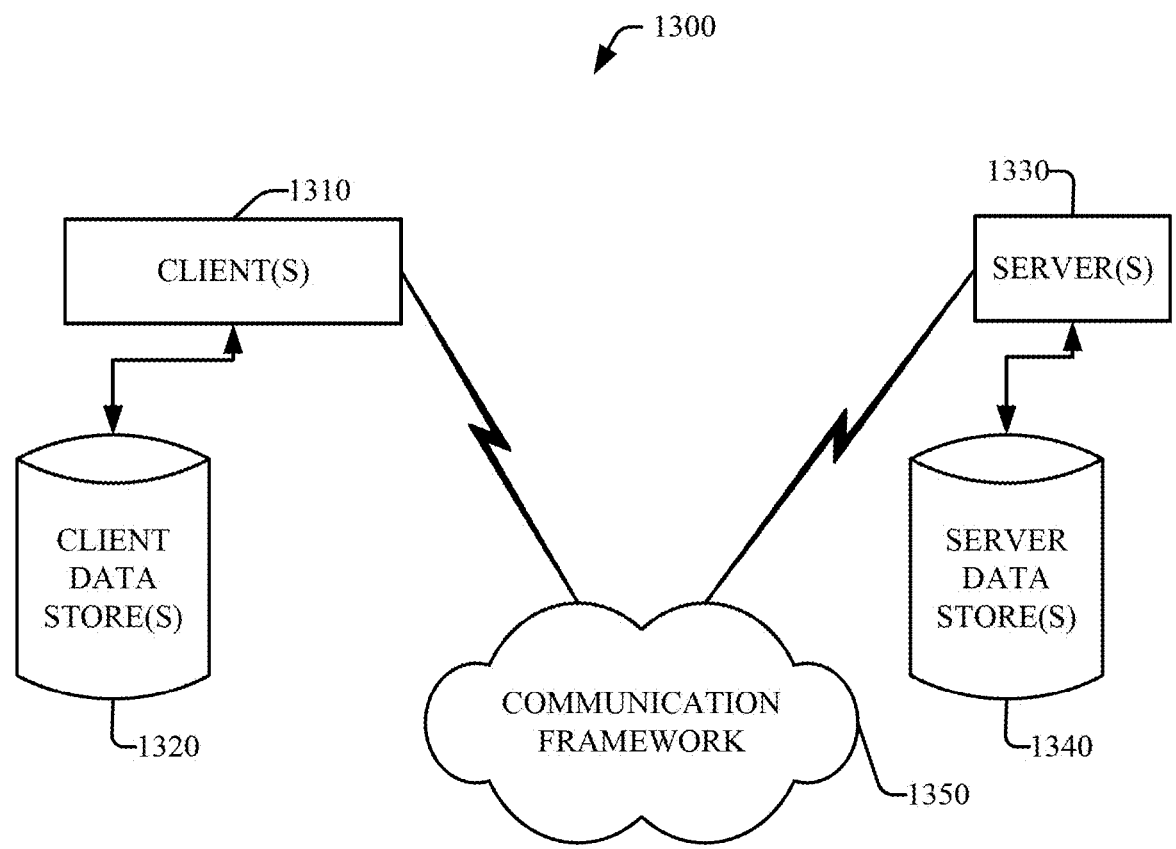
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented.

With reference to FIG. 12, a suitable environment 1200 for implementing various aspects of this disclosure includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 includes random access memory (RAM), which acts as external cache memory. By way of illustration and not limitation, RANI is available in many forms such as static RANI (SRAM), dynamic RAM (DRAM), synchronous DRAM (SDRAM), double data rate SDRANI (DDR SDRAM), enhanced SDRANI (ESDRAM), Synchlink DRANI (SLDRAM), direct Rambus RAM (DRRAM), direct Rambus dynamic RAM (DRDRAM), and Rambus dynamic RAM.

Computer 1212 also includes removable/non-removable, volatile/non-volatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RANI (FeRAM). Volatile memory can include RAM, which can act as external cache memory, for example. By way of illustration and not limitation, RANI is available in many forms such as synchronous RAM (SRAM), dynamic RAM (DRAM), synchronous DRAM (SDRAM), double data rate SDRAM (DDR SDRAM), enhanced SDRANI (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A digital prognostics system, comprising:
    a memory having stored thereon computer executable components;
    a processor that executes at least the following computer executable components:
        a data signature generation component that processes a corpus of stored data and generates respective digital signatures representing respective subsets of the corpus of the stored data, wherein the digital signatures are stored and indexed in a digital signature library, and wherein the digital signatures are generated based on physical characteristic of the stored data;
        a tagging component that tags the respective digital signatures with tags corresponding to extrinsic events, wherein the extrinsic events are identified through changes in the physical characteristics of the stored data;
        an artificial intelligence component that learns the respective digital signatures and associated tags, and generates inferences regarding the respective digital signatures;
        a search component that searches and compares a new digital signature to the learned digital signatures in order to identify one or more matches, wherein the physical characteristics of the learned digital signatures are compared to physical characteristics of the new digital signature;
        a prognostics component that prognoses an upcoming event associated with the new digital signature based at least in part on the generated inferences and the matches; and
        a display component that generates a user interface, for display, that outputs the prognoses in a human interpretable format.

2. The digital prognostics system of claim 1, wherein the data signature generation component generates a digital signature in response to an extrinsic event.

3. The digital prognostics system of claim 1, wherein the data signature generation component generates a digital signature based on a portion of the stored data that is associated with an interval of time before an extrinsic event.

4. The digital prognostics system of claim 1, wherein the data signature generation component generates the new digital signature in response to receiving a portion of the stored data associated with the new digital signature.

5. The digital prognostics system of claim 1, wherein the data signature generation component generates a digital signature based on feedback data received from the user interface.

6. The digital prognostics system of claim 1, wherein the data signature generation component receives the stored data from a database in communication with the digital prognostics system via a network.

7. The digital prognostics system of claim 1, wherein the search component determines that the new digital signature matches a digital signature from the digital signatures stored in the digital signature library.

8. The digital prognostics system of claim 1, wherein the prognostics component triggers an action in response to a determination that the new digital signature matches a digital signature from the learned digital signatures.

9. The digital prognostics system of claim 1, wherein the prognostics component correlates the upcoming event with an asset associated with the upcoming event.

10. A method, comprising:
generating, by a system comprising a processor, a first digital signature based on a portion of stored data, wherein the first digital signature is generated based on physical characteristic of the stored data;
tagging, by the system, the first digital signature with a tag corresponding to an event extrinsic to the system;
storing, by the system, the first digital signature in a digital signature library;
generating, by the system, inferences regarding the first digital signature;
comparing, by the system, a second digital signature to the first digital signature in order to identify a match, wherein the physical characteristics of the first digital signature are compared to physical characteristics of the second digital signature;
identifying, by the system, an upcoming event associated with the second digital signature based at least in part on the inferences and the match; and
generating, by the system, a user interface that outputs information associated with the upcoming event in a human interpretable format via a display.

11. The method of claim 10, wherein the generating the first digital signature comprises generating the first digital signature in response to the event.

12. The method of claim 10, wherein the generating the first digital signature comprises determining an interval of time associated with the portion that occurs before the event.

13. The method of claim 10, wherein the generating the first digital signature comprises generating the first digital signature based on input data received via the user interface.

14. The method of claim 10, further comprising generating, by the system, the second digital signature based on another portion of the stored data.

15. The method of claim 10, further comprising receiving, by the system, the stored data from a database in communication with the system via a wireless network.

16. The method of claim 10, further comprising triggering, by the system, an action extrinsic to the system in response to a determination that the second digital signature matches the first digital signature.

17. The method of claim 10, further comprising correlating, by the system, the upcoming event with an asset associated with the portion of the stored data.

18. A computer readable storage device comprising instructions that, in response to execution, cause a system comprising a processor to perform operations, comprising:
generating a first digital fingerprint based on a portion of data stored in a first data store, wherein the first digital fingerprint is generated based on physical characteristic of the stored data;
generating a tag for the first digital fingerprint to associate the first digital fingerprint with an extrinsic event, wherein the extrinsic event is identified through changes in the physical characteristics of the first digital fingerprint;
storing the first digital fingerprint in a second data store;
determining inferences associated with the first digital fingerprint;
identifying a match between a second digital fingerprint and the first digital fingerprint, comprising identifying an upcoming event associated with the second digital fingerprint based at least in part on the inferences and the match; and
presenting information associated with the upcoming event in a human interpretable format via a user interface associated with a display.

19. The computer readable storage device of claim 18, wherein the generating the first digital fingerprint comprises generating the first digital fingerprint in response to identifying the extrinsic event.

20. The computer readable storage device of claim 18, wherein the generating the first digital fingerprint comprises determining a period of time associated with the portion that occurs prior to the extrinsic event.

* * * * *